United States Patent
Wu et al.

(10) Patent No.: US 11,888,608 B2
(45) Date of Patent: Jan. 30, 2024

(54) DATA TRANSMISSION METHOD AND APPARATUS IN BACKSCATTER COMMUNICATION

(71) Applicant: HUAWEI TECHNOLOGIES CO., LTD., Guangdong (CN)

(72) Inventors: Tao Wu, Shenzhen (CN); Teyan Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 65 days.

(21) Appl. No.: 17/696,420

(22) Filed: Mar. 16, 2022

(65) Prior Publication Data

US 2022/0209886 A1    Jun. 30, 2022

Related U.S. Application Data

(63) Continuation of application No. PCT/CN2020/108596, filed on Aug. 12, 2020.

(30) Foreign Application Priority Data

Sep. 17, 2019 (CN) .......................... 201910877846.6

(51) Int. Cl.
*H04L 1/00* (2006.01)
*H04L 27/04* (2006.01)
*H04L 27/20* (2006.01)

(52) U.S. Cl.
CPC ............ *H04L 1/0003* (2013.01); *H04L 27/04* (2013.01); *H04L 27/20* (2013.01)

(58) Field of Classification Search
CPC ....... H04L 1/0003; H04L 27/04; H04L 27/20; H04L 5/0014; H04L 5/0016; H04L 5/0021; H04L 5/023; H04L 5/026; H04L 5/04

See application file for complete search history.

(56) References Cited

U.S. PATENT DOCUMENTS 5,867,535 A * 2/1999 Phillips .................... G01S 1/04
                                                         375/295
6,509,836 B1 * 1/2003 Ingram ................. G01S 13/825
                                                         340/572.7

(Continued)

FOREIGN PATENT DOCUMENTS

CN        103747521 A       4/2014
CN        104766032 A       7/2015

(Continued)

OTHER PUBLICATIONS

Ensworth et al., "Every smart phone is a backscatter reader: Modulated backscatter compatibility with Bluetooth 4.0 Low Energy (BLE) devices," 2015 IEEE International Conference on RFID, Apr. 2015, 8 pages.

(Continued)

*Primary Examiner* — James M Perez
(74) *Attorney, Agent, or Firm* — Fish & Richardson P.C.

(57) ABSTRACT

Embodiments of this application disclose a data transmission method, apparatus, and system in backscatter communication, to improve spectrum usage efficiency of data. An embodiment of this application provides a data transmission method in backscatter communication, including: generating a first frame, where the first frame carries first data and second data, the first data and the second data in the first frame use different modulation schemes, the first data is sent to a first tag, and the second data is sent to a second tag; and sending the first frame to the first tag and the second tag.

17 Claims, 7 Drawing Sheets

(56) References Cited

U.S. PATENT DOCUMENTS

| | | | | |
|---|---|---|---|---|
| 6,665,308 B1* | 12/2003 | Rakib | ............... | H04L 27/362 |
| | | | | 370/479 |
| 7,796,016 B2* | 9/2010 | Fukuda | ............... | G01S 13/758 |
| | | | | 455/45 |
| 8,472,305 B2* | 6/2013 | Wu | ............... | H04L 1/0045 |
| | | | | 370/204 |
| 8,885,455 B2* | 11/2014 | Wu | ............... | H04L 1/0625 |
| | | | | 370/204 |
| 8,952,789 B2* | 2/2015 | Dardari | ............... | H04B 1/719 |
| | | | | 375/295 |
| 9,215,664 B2* | 12/2015 | Yin | ............... | H04W 52/42 |
| 9,312,950 B1* | 4/2016 | Deyle | ............... | H04B 7/26 |
| 9,379,785 B2* | 6/2016 | Shameli | ............... | H04B 5/02 |
| 9,514,402 B1* | 12/2016 | Kim | ............... | G06K 19/0726 |
| 9,762,282 B1* | 9/2017 | Muellner | ............... | G06K 19/0723 |
| 10,146,967 B2* | 12/2018 | Caruana | ............... | G06K 7/0008 |
| 10,936,927 B2* | 3/2021 | Sundaresan | ............... | G06K 7/01 |
| 11,201,775 B2* | 12/2021 | Lopez | ............... | H04B 5/0031 |
| 11,252,383 B2* | 2/2022 | Chen | ............... | H04N 9/312 |
| 11,303,498 B2* | 4/2022 | Huang | ............... | H04B 10/5161 |
| 11,638,136 B2* | 4/2023 | Lopez | ............... | H04W 24/10 |
| | | | | 342/367 |
| 2001/0048361 A1* | 12/2001 | Mays | ............... | G06K 7/10297 |
| | | | | 340/10.51 |
| 2005/0031051 A1* | 2/2005 | Rosen | ............... | H04B 1/713 |
| | | | | 375/147 |
| 2005/0206552 A1* | 9/2005 | Friedrich | ............... | G06K 7/10297 |
| | | | | 342/42 |
| 2005/0206555 A1* | 9/2005 | Bridgelall | ............... | G01S 13/46 |
| | | | | 340/8.1 |
| 2005/0253747 A1* | 11/2005 | Taki | ............... | H04L 27/04 |
| | | | | 342/42 |
| 2006/0107307 A1* | 5/2006 | Knox | ............... | G01S 13/46 |
| | | | | 726/2 |
| 2006/0118622 A1* | 6/2006 | Zatloukal | ............... | H04M 1/72412 |
| | | | | 235/382 |
| 2006/0139186 A1* | 6/2006 | Hoyer | ............... | H04L 25/4917 |
| | | | | 341/50 |
| 2006/0198335 A1* | 9/2006 | Reunamaki | ............... | H04L 12/12 |
| | | | | 370/468 |
| 2006/0269294 A1* | 11/2006 | Kikuchi | ............... | H04B 10/5561 |
| | | | | 398/161 |
| 2007/0001813 A1* | 1/2007 | Maguire | ............... | G06K 7/10356 |
| | | | | 340/10.2 |
| 2007/0049200 A1* | 3/2007 | Nagai | ............... | H04B 1/126 |
| | | | | 455/63.1 |
| 2007/0096876 A1* | 5/2007 | Bridgelall | ............... | H04B 7/0802 |
| | | | | 340/572.1 |
| 2007/0103303 A1* | 5/2007 | Shoarinejad | ............... | H04W 76/40 |
| | | | | 340/572.1 |
| 2007/0174907 A1* | 7/2007 | Davis | ............... | G06Q 20/3574 |
| | | | | 726/9 |
| 2007/0297534 A1* | 12/2007 | Okunev | ............... | H04L 27/362 |
| | | | | 340/10.52 |
| 2008/0215951 A1* | 9/2008 | Oshima | ............... | H04N 21/631 |
| | | | | 348/E11.003 |
| 2009/0086869 A1* | 4/2009 | Bae | ............... | G06K 7/10297 |
| | | | | 375/360 |
| 2009/0136200 A1* | 5/2009 | Tokunaka | ............... | G11B 27/034 |
| | | | | 386/278 |
| 2009/0196210 A1* | 8/2009 | Desai | ............... | H04W 52/0225 |
| | | | | 370/311 |
| 2009/0221232 A1* | 9/2009 | Estevez | ............... | H04W 88/06 |
| | | | | 455/41.1 |
| 2009/0253451 A1* | 10/2009 | Trachewsky | ............... | H04W 4/14 |
| | | | | 455/509 |
| 2010/0111215 A1* | 5/2010 | Nandagopalan | ............... | H04B 7/0617 |
| | | | | 375/267 |
| 2010/0226461 A1* | 9/2010 | Tomizawa | ............... | H04B 5/02 |
| | | | | 375/340 |
| 2010/0232348 A1* | 9/2010 | Wu | ............... | H04L 1/0003 |
| | | | | 370/329 |
| 2010/0290791 A1* | 11/2010 | Sonoda | ............... | G03G 15/0863 |
| | | | | 399/12 |
| 2012/0183100 A1* | 7/2012 | Luzzi | ............... | H04L 27/06 |
| | | | | 375/340 |
| 2012/0242481 A1* | 9/2012 | Gernandt | ............... | G06K 19/0705 |
| | | | | 340/572.1 |
| 2012/0327846 A1* | 12/2012 | Wu | ............... | H04L 1/0045 |
| | | | | 370/329 |
| 2013/0023210 A1* | 1/2013 | Rofougaran | ............... | H01L 24/49 |
| | | | | 455/41.1 |
| 2013/0106580 A1* | 5/2013 | Bae | ............... | H04L 1/0045 |
| | | | | 340/10.1 |
| 2013/0162401 A1* | 6/2013 | Bae | ............... | H04L 27/2637 |
| | | | | 340/10.1 |
| 2013/0234536 A1* | 9/2013 | Chemishkian | ............... | H02J 50/40 |
| | | | | 307/149 |
| 2013/0265140 A1* | 10/2013 | Gudan | ............... | H04W 52/0245 |
| | | | | 340/10.3 |
| 2013/0342320 A1* | 12/2013 | Hinman | ............... | G06K 19/07327 |
| | | | | 340/10.1 |
| 2014/0133530 A1* | 5/2014 | Maguire | ............... | H04W 60/00 |
| | | | | 375/219 |
| 2014/0206367 A1* | 7/2014 | Agee | ............... | H04B 7/0413 |
| | | | | 455/450 |
| 2014/0249825 A1* | 9/2014 | Proud | ............... | A61B 5/681 |
| | | | | 704/275 |
| 2014/0306805 A1* | 10/2014 | Jung | ............... | G06K 19/0723 |
| | | | | 340/10.1 |
| 2014/0328423 A1* | 11/2014 | Agee | ............... | H04W 52/42 |
| | | | | 375/267 |
| 2015/0009014 A1* | 1/2015 | Mo | ............... | G06K 7/10366 |
| | | | | 340/10.1 |
| 2015/0091706 A1* | 4/2015 | Chemishkian | ............... | G06K 7/10158 |
| | | | | 340/10.34 |
| 2015/0229133 A1* | 8/2015 | Reynolds | ............... | H02J 7/0048 |
| | | | | 307/24 |
| 2016/0212749 A1* | 7/2016 | Abraham | ............... | H04L 1/0041 |
| 2016/0329931 A1* | 11/2016 | Mukherjee | ............... | H04B 5/0062 |
| 2016/0365890 A1* | 12/2016 | Reynolds | ............... | H04B 1/10 |
| 2016/0374062 A1* | 12/2016 | Seok | ............... | H04L 5/0053 |
| 2017/0325175 A1* | 11/2017 | Dinan | ............... | H04L 5/0098 |
| 2017/0332375 A1* | 11/2017 | Dinh | ............... | H04W 74/04 |
| 2018/0062981 A1* | 3/2018 | Richley | ............... | H04B 1/06 |
| 2018/0091634 A1* | 3/2018 | Mobasher | ............... | H04N 19/66 |
| 2018/0096238 A1* | 4/2018 | Buller | ............... | G06Q 20/3278 |
| 2018/0304086 A1* | 10/2018 | Shellhammer | ............... | H04B 7/0608 |
| 2018/0375703 A1* | 12/2018 | Kellogg | ............... | H04L 27/26 |
| 2019/0089571 A1* | 3/2019 | Von Novak, III | ............... | H04L 1/0003 |
| 2019/0141666 A1* | 5/2019 | Luo | ............... | G01S 5/02213 |
| 2019/0274144 A1* | 9/2019 | Zhang | ............... | H04B 7/22 |
| 2019/0317206 A1* | 10/2019 | Sundaresan | ............... | G01S 13/765 |
| 2020/0052734 A1* | 2/2020 | Talla | ............... | H04B 1/1081 |
| 2020/0107324 A1* | 4/2020 | Kim | ............... | H04W 72/0466 |
| 2020/0151532 A1* | 5/2020 | Sundaresan | ............... | G06K 7/10297 |
| 2020/0213034 A1* | 7/2020 | Zhou | ............... | H04L 27/2692 |
| 2020/0236605 A1* | 7/2020 | Yiu | ............... | H04W 36/32 |
| 2020/0284883 A1* | 9/2020 | Ferreira | ............... | G01S 7/4816 |
| 2021/0279433 A1* | 9/2021 | Kan | ............... | H04B 7/216 |
| 2021/0334486 A1* | 10/2021 | De Oliveira | ............... | G06K 7/10366 |
| 2021/0373111 A1* | 12/2021 | Hui | ............... | G01S 1/022 |
| 2022/0007386 A1* | 1/2022 | Wu | ............... | H04N 21/43637 |
| 2022/0027701 A1* | 1/2022 | Cobb | ............... | G06K 7/10336 |
| 2022/0077982 A1* | 3/2022 | Zhang | ............... | H04L 5/0014 |
| 2022/0120893 A1* | 4/2022 | Lee | ............... | H04L 27/18 |
| 2022/0209886 A1* | 6/2022 | Wu | ............... | H04L 27/0008 |
| 2022/0224583 A1* | 7/2022 | Rosenthal | ............... | H04L 27/02 |
| 2022/0278886 A1* | 9/2022 | Yan | ............... | H04B 7/026 |
| 2022/0343089 A1* | 10/2022 | Turner | ............... | G06K 7/10475 |
| 2023/0003827 A1* | 1/2023 | Ko | ............... | G01S 5/0236 |
| 2023/0119392 A1* | 4/2023 | Wang | ............... | H04B 5/0031 |
| | | | | 370/311 |
| 2023/0119907 A1* | 4/2023 | Wu | ............... | H04L 27/04 |
| | | | | 375/262 |
| 2023/0209555 A1* | 6/2023 | Sosnin | ............... | H04L 5/0053 |
| | | | | 370/329 |

(56) References Cited

U.S. PATENT DOCUMENTS

2023/0222015 A1* 7/2023 Rowoldt .............. G11B 27/031
  719/329

FOREIGN PATENT DOCUMENTS

| CN | 105722146 A | 6/2016 |
| CN | 108631906 A | 10/2018 |
| CN | 109412992 A | 3/2019 |

OTHER PUBLICATIONS

PCT International Search Report and Written Opinion issued in International Application No. PCT/CN2020/108596 dated Nov. 17, 2020, 13 pages (with English translation).

Office Action issued in Chinese Application No. 201910877846.6 dated Jun. 6, 2022, 14 pages (with English translation).

* cited by examiner

DATA TRANSMISSION METHOD AND APPARATUS IN BACKSCATTER COMMUNICATION

CROSS-REFERENCE TO RELATED APPLICATIONS

This application is a continuation of International Patent Application No. PCT/CN2020/108596, filed on Aug. 12, 2020, which claims priority to Chinese Patent Application No. 201910877846.6 filed on Sep. 17, 2019. The disclosures of the aforementioned applications are hereby incorporated by reference in their entireties.

TECHNICAL FIELD

This application relates to the field of backscatter communication, and in particular, to a data transmission method, apparatus, and system in backscatter communication.

BACKGROUND

Backscatter communication is also referred to as modulated backscatter (Modulated Backscatter). Backscatter communication is applicable to a low-cost and low-power system. A transmitter that uses backscatter communication does not generate a radio frequency signal, and the transmitter may send information by modulating a radio frequency signal in an environment. For example, the transmitter may generally be a tag, the radio frequency signal may be sent by a base station, and the radio frequency signal sent by the base station is reflected by the tag. The radio frequency signal may include a radio television signal, a broadcast signal, a signal sent by a mobile communication station, a signal sent by a wireless access point, a signal sent by a dedicated card reader, and the like.

In backscatter communication, one base station can send an excitation signal to only one tag at a time. After the tag receives the excitation signal, the tag reflects the excitation signal back to the base station. At present, a sine wave signal is usually used as the excitation signal. Since the sine wave signal has the characteristic of constant waveform, it is easy to eliminate self interference.

In the foregoing solution, because the base station can perform data transmission with only one tag at a time, spectrum usage efficiency of data is reduced.

SUMMARY

Embodiments of this application provide a data transmission method, apparatus, and system in backscatter communication, to improve spectrum usage efficiency of data.

To resolve the foregoing technique problem, embodiments of this application provide the following technical solutions.

According to a first aspect, an embodiment of this application provides a data transmission method in backscatter communication, including: generating a first frame, where the first frame carries first data and second data, the first data and the second data in the first frame use different modulation schemes, the first data is sent to a first tag, and the second data is sent to a second tag; and sending the first frame to the first tag and the second tag. In this embodiment of this application, the first frame may be sent to both the first tag and the second tag. The first data and the second data in the first frame use different modulation schemes, so that the first tag can obtain the first data from the first frame, the second tag may obtain the second data front the first frame, and data is sent to the first tag and the second tag at the same time. This can improve spectrum usage efficiency of the data.

In a possible implementation, the first frame includes an indication field and a data field. The indication field is used to indicate modulation schemes respectively used by the first data and the second data, and the data field is used to carry the first data and the second data. In this solution, the first frame generated by a data transmission apparatus includes at least two fields: the indication field and the data field. The indication field indicates modulation schemes respectively used by the first data and the second data, and the data field carries both the first data and the second data. The first frame generated by the data transmission apparatus includes the indication field, so that the first tag and the second tag determine, by parsing the indication field, a modulation scheme corresponding to data that needs to be respectively received. Therefore, the first tag and the second tag may demodulate the data field by using respective corresponding modulation schemes. The first tag may obtain the first data from the data field, and the second tag may obtain the second data from the data field. Therefore, the first tag and the second tag as data receivers may separately obtain downlink data sent by the data transmission apparatus to the first tag and the second tag, thereby implementing simultaneous communication between the data transmission apparatus and the first tag and the second tag. This can improve spectrum usage efficiency of the data.

In a possible implementation, the indication field is further used to indicate a transmission rate used for the first data and a transmission rate used for the second data. The data transmission apparatus may further indicate a transmission rate of each type of data by using the indication field. For example, the indication field indicates a transmission rate used for the first data and further indicates a transmission rate used for the second data, so that the first tag and the second tag parse the indication field to determine a transmission rate corresponding to each data that needs to be received. Therefore, the first tag and the second tag may receive the data field by using respective corresponding transmission rates. The first tag may obtain the first data from the data field, and the second tag may obtain the second data from the data field. Therefore, the first tag and the second tag as data receivers may separately obtain downlink data sent by the data transmission apparatus to the first tag and the second tag, thereby implementing simultaneous communication between the data transmission apparatus and the first tag and the second tag. This can improve spectrum usage efficiency of the data.

In a possible implementation, the transmission rate of the second data is N times the transmission rate of the first data, and N is a positive integer greater than or equal to 1. In embodiments of this application, the first tag and the second tag may receive the data field by using the respective corresponding transmission rates. The first tag may obtain the first data from the data field, and the second tag may obtain the second data from the data field.

In a possible implementation, the first frame further includes a synchronization field, and the synchronization field is used to synchronously receive the first frame by the first tag and the second tag. Specifically, in addition to the indication field and the data field, the first frame generated by the data transmission apparatus may further include the synchronization field. The synchronization field is located in a header of the first frame, so that the first tag and the second tag determine respective moments at which data needs to be received by using the synchronization field. Therefore, the first tag and the second tag may receive the indication field and the data field at the respective corresponding moments. The first tag and the second tag then demodulate the data field. The first tag may obtain the first data from the data field, and the second tag may obtain the second data from the data field. Therefore, the first tag and the second tag as data receivers may separately obtain downlink data sent by the data transmission apparatus to the first tag and the second tag, thereby implementing simultaneous communication between the data transmission apparatus and the first tag and the second tag. This can improve spectrum usage efficiency of the data.

In a possible implementation, the first data uses amplitude modulation, and the second data uses phase modulation; or the first data uses phase modulation, and the second data uses amplitude modulation; or both the first data and the second data use amplitude modulation, and the first data and the second data have different amplitude values. After the data transmission apparatus determines the first data that needs to be sent to the first tag and the second data that needs to be sent to the second tag, the data transmission apparatus may modulate the first data and the second data, to generate the first frame. The first data and the second data in the first frame use different modulation schemes. For example, one of the two pieces of data (that is, the first data and the second data) uses amplitude modulation, and the other piece of data uses phase modulation. In this case, modulation schemes are different, so that the first tag and the second tag determine a modulation scheme corresponding to each data that needs to be received. Therefore, the first tag and the second tag may demodulate the first frame by using respective corresponding modulation schemes. The first tag may obtain the first data from the first frame, and the second tag may obtain the second data from the first frame. Therefore, the first tag and the second tag as data receivers may separately obtain downlink data sent by the data transmission apparatus to the first tag and the second tag, thereby implementing simultaneous communication between the data transmission apparatus and the first tag and the second tag. This can improve spectrum usage efficiency of the data.

In a possible implementation, the first frame includes a result obtained after a multiplication operation is performed on the first data and the second data. In this embodiment of this application, the data transmission apparatus performs the multiplication operation on the first data and the second data, and the first frame generated by the data transmission apparatus carries a multiplication result, so that the first frame can carry both the first data and the second data.

According to a second aspect, an embodiment of this application further provides a data transmission method in backscatter communication, including: generating a first frame, where the first frame carries first data, the first data is an excitation signal sent to a first tag, and the first data includes downlink data sent to a second tag; sending the first frame to the first tag and the second tag; and receiving a second frame sent by the first tag, where the second frame carries the first data and second data, the first data and the second data in the second frame use different modulation schemes, and the second data is uplink data sent by the first tag. In this embodiment of this application, the first frame may be sent to both the first tag and the second tag, so that the first tag may reflect the first data as the excitation signal, and the second frame reflected by the first tag carries the second data. In addition, the second tag may obtain the first data from the first frame, thereby implementing uplink and downlink communication with the first tag, and improving spectrum usage efficiency of data.

In a possible implementation, the first frame includes a first indication field and a first data field, where the first indication field is used to indicate a modulation scheme used by the first data, and the first data field is used to carry the first data. Specifically, the first frame generated by a data transmission apparatus includes at least two fields: the first indication field and the first data field. The first indication field indicates the modulation scheme used by the first data, and the first data field carries the first data. The first frame generated by the data transmission apparatus includes the first indication field, so that the first tag and the second tag determine, by parsing the first indication field, a modulation scheme corresponding to the first data that needs to be received. Therefore, the first tag and the second tag may demodulate the first data field by using the modulation scheme corresponding to the first data. Both the first tag and the second tag may obtain the first data from the first data field, but manners of using the first data by the first tag and the second tag are different. It can be learned from subsequent descriptions that the first tag uses the first data as the excitation signal, and then the first tag may reflect the second frame to the data transmission apparatus. The data transmission apparatus may receive the second frame. The data transmission apparatus implements uplink and downlink communication with the first tag. This can improve spectrum usage efficiency of the data. In addition, the second tag may parse the first data, to obtain downlink data sent by the data transmission apparatus to the second tag. For example, the second tag may obtain data content of the downlink data, or the second tag may respond to the downlink data and execute downlink instructions of the data transmission apparatus.

In a possible implementation, the first indication field is further used to indicate a transmission rate of the first data. The data transmission apparatus may further indicate the transmission rate of the first data by using the first indication field. For example, the first indication field indicates the transmission rate used for the first data, so that the first tag and the second tag determine, by parsing the first indication field, a transmission rate corresponding to respective first data that needs to be received. Therefore, the first tag and the second tag may demodulate the first data field by using the modulation scheme corresponding to the first data. Both the first tag and the second tag may obtain the first data from the first data field, but manners of using the first data by the first tag and the second tag are different. It can be learned from subsequent descriptions that the first tag uses the first data as the excitation signal, and then the first tag may reflect the second frame to the data transmission apparatus. The data transmission apparatus may receive the second frame. The data transmission apparatus implements uplink and downlink communication with the first tag. This can improve spectrum usage efficiency of the data.

In a possible implementation, the second frame includes a second indication field and a second data field, where the second indication field is used to indicate modulation schemes respectively used by the first data and the second data, and the second data field is used to carry the first data and the second data. Specifically, the second frame generated by the first tag includes at least two fields: the second indication field and the second data field. The second indication field indicates the modulation schemes respectively used by the first data and the second data, and the second data field carries the first data and the second data. The second frame generated by the first tag includes the second indication field, so that the data transmission apparatus determines, by parsing the second indication field, the modulation scheme corresponding to the first data that needs to be received. Therefore, the data transmission apparatus may demodulate the second data field by using the modulation scheme corresponding to the first data. The data transmission apparatus may obtain the first data from the second data field. In addition, the data transmission apparatus determines, by parsing the second indication field, the modulation scheme corresponding to the second data that needs to be received. Therefore, the data transmission apparatus may demodulate the second data field by using the modulation scheme corresponding to the second data, and the data transmission apparatus may obtain the second data from the second data field. The data transmission apparatus implements uplink and downlink communication with the first tag. This can improve spectrum usage efficiency of the data.

In a possible implementation, the second indication field is further used to indicate the transmission rate used for the first data and a transmission rate used for the second data. The second frame may further indicate a transmission rate of each type of data by using the second indication field. For example, the second indication field indicates the transmission rate used for the first data and further indicates the transmission rate used for the second data, so that the data transmission apparatus determines, by parsing the second indication field, a transmission rate corresponding to each type of data that needs to be received. Therefore, the data transmission apparatus may receive the second data field by using different data transmission rates. The data transmission apparatus may obtain the first data from the second data field, and the data transmission apparatus may obtain the second data from the second data field. Therefore, the data transmission apparatus implements uplink and downlink communication with the first tag. This can improve spectrum usage efficiency of the data.

In a possible implementation, the transmission rate of the second data is N times the transmission rate of the first data, and N is a positive integer greater than or equal to 1. In this embodiment of this application, the data transmission apparatus may receive the second data field by using the different data transmission rates. The transmission rates of the first data and the second data meet an N-times relationship. The data transmission apparatus may obtain the first data from the second data field, and the data transmission apparatus may obtain the second data from the second data field. Therefore, different data is transmitted in the second frame at different transmission rates, and the data transmission apparatus receives the first data and the second data from the second frame.

In a possible implementation, the first data uses amplitude modulation, and the second data uses phase modulation; or the first data uses phase modulation, and the second data uses amplitude modulation; or both the first data and the second data use amplitude modulation, and the first data and the second data have different amplitude values. After the first tag determines that the first data is used for the excitation signal and the second data is the uplink data that needs to be sent to the data transmission apparatus, the first tag may modulate the first data and the second data, to generate the second frame. The first data and the second data in the second frame use different modulation schemes. For example, one of the two pieces of data (that is, the first data and the second data) uses amplitude modulation, and the other data uses phase modulation. The first tag may carry both the first data and the second data in the second frame by using two different modulation schemes, so that the data transmission apparatus identifies, from the second frame, the excitation signal and the uplink data sent by the first tag. The data transmission apparatus implements uplink and downlink communication with the first tag. This can improve spectrum usage efficiency of the data.

In a possible implementation, the first data is broadcast data, or the first data is unicast data sent to the second tag. If the first data sent by the data transmission apparatus to the second tag is the broadcast data, the second tag may receive the broadcast data, and another second tag in a communication network may also receive the broadcast data. In addition, if the first data is the unicast data sent to a second tag, the second tag may obtain the unicast data sent by the data transmission apparatus. For example, the unicast data may be service data sent to the second tag, or downlink scheduling instructions sent to the second tag. For example, the second tag may be a second tag, the first data may be downlink scheduling instructions sent to the second tag. After the second tag obtains the first data from the first frame, the second tag may also send the uplink data of the second tag to the data transmission apparatus based on the downlink scheduling instructions of the data transmission apparatus.

In a possible implementation, the second frame includes a result obtained after a multiplication operation is performed on the first data and the second data. In this embodiment of this application, the data transmission apparatus performs the multiplication operation on the first data and the second data, and the first frame generated by the data transmission apparatus carries a multiplication result, so that the first frame can carry both the first data and the second data.

According to a third aspect, an embodiment of this application further provides a data transmission apparatus, including: a processing module, configured to generate a first frame, where the first frame carries first data and second data, the first data and the second data in the first frame use different modulation schemes, the first data is sent to a first tag, and the second data is sent to a second tag; and a sending module, configured to send the first frame to the first tag and the second tag.

In a possible implementation, the first frame includes an indication field and a data field. The indication field is used to indicate modulation schemes respectively used by the first data and the second data, and the data field is used to carry the first data and the second data.

In a possible implementation, the indication field is further used to indicate a transmission rate used for the first data and a transmission rate used for the second data.

In a possible implementation, the transmission rate of the second data is N times the transmission rate of the first data, and N is a positive integer greater than or equal to 1.

In a possible implementation, the first frame further includes a synchronization field, and the synchronization field is used to synchronously receive the first frame by the first tag and the second tag.

In a possible implementation, the first data uses amplitude modulation, and the second data uses phase modulation; or the first data uses phase modulation, and the second data uses amplitude modulation; or both the first data and the second data use amplitude modulation, and the first data and the second data have different amplitude values.

In a possible implementation, the first frame includes a result obtained after a multiplication operation is performed on the first data and the second data.

In the third aspect of this application, the modules of the data transmission apparatus may further perform steps described in the first aspect and the possible implementations. For details, refer to the foregoing descriptions in the first aspect and the possible implementations.

According to a fourth aspect, an embodiment of this application further provides a data transmission apparatus, including: a processing module, configured to generate a first frame, where the first frame carries first data, the first data is an excitation signal sent to a first tag, and the first data includes downlink data sent to a second tag; a sending module, configured to send the first frame to the first tag and the second tag; and a receiving module, configured to receive a second frame sent by the first tag, where the second frame carries the first data and second data, the first data and the second data in the second frame use different modulation schemes, and the second data is uplink data sent by the first tag.

In a possible implementation, the first frame includes a first indication field and a first data field, where the first indication field is used to indicate a modulation scheme used by the first data, and the first data field is used to carry the first data.

In a possible implementation, the first indication field is further used to indicate a transmission rate of the first data.

In a possible implementation, the second frame includes a second indication field and a second data field, where the second indication field is used to indicate modulation schemes respectively used by the first data and the second data, and the second data field is used to carry the first data and the second data.

In a possible implementation, the second indication field is further used to indicate the transmission rate used for the first data and a transmission rate used for the second data.

In a possible implementation, the transmission rate of the second data is N times the transmission rate of the first data, and N is a positive integer greater than or equal to 1.

In a possible implementation, the first data uses amplitude modulation, and the second data uses phase modulation; or the first data uses phase modulation, and the second data uses amplitude modulation; or both the first data and the second data use amplitude modulation, and the first data and the second data have different amplitude values.

In a possible implementation, the first data is broadcast data, or the first data is unicast data sent to the second tag.

The first frame includes a result obtained after a multiplication operation is performed on the first data and the second data.

In the fourth aspect of this application, the modules of the data transmission apparatus may further perform steps described in the second aspect and the possible implementations. For details, refer to the foregoing descriptions in the second aspect and the possible implementations.

According to a fifth aspect, an embodiment of this application further provides a backscatter communication system, where the backscatter communication system includes a data transmission apparatus, a first tag, and a second tag.

The data transmission apparatus is configured to perform any method according to the first aspect.

The first tag is configured to receive a first frame sent by the data transmission apparatus, and obtain first data from the first frame.

The second tag is configured to receive the first frame sent by the data transmission apparatus, and obtain second data from the first frame.

According to a sixth aspect, an embodiment of this application further provides a backscatter communication system, where the backscatter communication system includes a data transmission apparatus, a first tag, and a second tag.

The data transmission apparatus is configured to perform any method according to the second aspect.

The first tag is configured to receive a first frame sent by the data transmission apparatus, and obtain first data from the first frame. The first tag sends a second frame to the data transmission apparatus, where the second frame carries the first data and second data, the first data and the second data in the second frame use different modulation schemes, and the second data is uplink data sent by the first tag.

The second tag is configured to receive the first frame sent by the data transmission apparatus, and obtain the first data from the first frame.

According to a seventh aspect, an embodiment of this application provides a computer-readable storage medium. The computer-readable storage medium stores instructions, and when the instructions are run on a computer, the computer s enabled to perform the method according to the first aspect or the second aspect.

According to an eighth aspect, an embodiment of this application provides a computer program product including instructions. When the computer program product runs on a computer, the computer is enabled to perform the method according to the first aspect or the second aspect.

According to a ninth aspect, an embodiment of this application provides a communication apparatus, where the communication apparatus may include an entity such as a data transmission apparatus, a terminal device, or a chip. The communication apparatus includes a processor and a memory. The memory is configured to store instructions. The processor is configured to execute the instructions in the memory, so that the communication apparatus performs any one of the methods in the foregoing first or second aspect.

According to a tenth aspect, this application provides a chip system. The chip system includes a processor, configured to implement functions in the foregoing aspects, for example, sending or processing data and/or information in the foregoing methods. In a possible design, the chip system further includes a memory, and the memory is configured to store program instructions and data that are necessary for a data transmission apparatus. The chip system may include a chip, or may include a chip and another discrete component.

DESCRIPTION OF EMBODIMENTS

Figure 1:
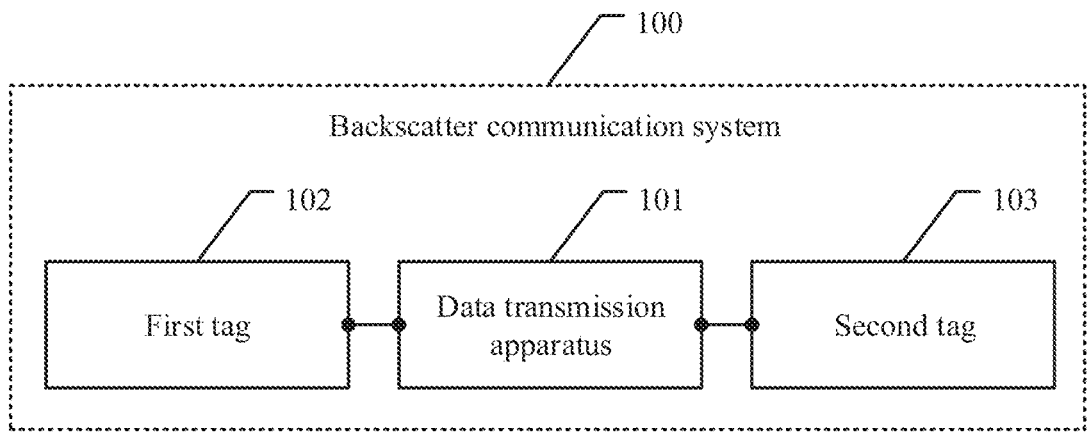
FIG. 1 is a schematic diagram depicting a structure of a backscatter communication system according to an embodiment of this application.

Embodiments of this application provide a data transmission method, apparatus, and system in backscatter communication, to improve spectrum usage efficiency of data.

The following describes embodiments of this application with reference to accompanying drawings.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "have", and any other variations thereof are intended to cover the non-exclusive inclusion, so that a process, method, system, product, or device that includes a series of units is not limited to those units, but may include other units not expressly listed or inherent to such a process, method, product, or device.

The technical solutions in embodiments of this application may be applied to a backscatter communication system. There may be a plurality of communication system architectures applicable to the backscatter communication system, for example, code division multiple access (code division multiple access, CDMA), time division multiple access (time division multiple access, TDMA), frequency division multiple access (frequency division multiple access, FDMA), orthogonal frequency division multiple access (orthogonal frequency-division multiple access, OFDMA), single carrier frequency division multiple access (single carrier FDMA, SC-FDMA), and other systems. Terms "system" and "network" may be interchanged with each other. The CDMA system may implement wireless technologies such as universal terrestrial radio access (universal terrestrial radio access, UTRA) and CDMA2000. The UTRA may include a wideband CDMA (wideband CDMA, WCDMA) technology and another variant technology of CDMA. CDMA2000 may cover the interim standard (interim standard, IS) 2000 (IS-2000), the IS-95 standard, and the IS-856 standard. The TDMA system may implement wireless technologies such as a global system for mobile communication (global system for mobile communication, GSM). The OFDMAA system may implement wireless technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA. The UTRA corresponds to a UMTS, and the E-UTRA corresponds to an evolved version of the UMTS. A new version of the UMTS that uses the E-UTRA is used in long term evolution (long term evolution, LTE) and various versions evolved based on LTE in 3GPP. A 5th generation (5th Generation, "5G" for short) communication system or new radio (New Radio, "NR" for short) is a next generation communication system under study. In addition, the communication system is further applicable to a future-oriented communication technology, and is applicable to the technical solutions provided in embodiments of this application. A system architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of a network architecture and emergence of a new service scenario, the technical solutions provided in embodiments of this application are also applicable to similar technical problems.

FIG. 1 is a schematic diagram depicting a structure of a possible backscatter communication system according to an embodiment of this application. A backscatter communication system 100 includes a data transmission apparatus 101, a first tag 102, and a second tag 103. The data transmission apparatus 101 may simultaneously communicate with the second tag 103 and the first tag 102. For example, the data transmission apparatus 101 establishes a wireless communication connection to the second tag 103 and the first tag 102.

The data transmission apparatus 101 may be a network device, and the network device may be any device with a wireless transceiving function, or a chip disposed in a device with a specific wireless transceiving function. The network device includes but is not limited to a base station (for example, a base station (BS), a NodeB, an evolved NodeB (eNodeB) or eNB, a gNodeB or gNB in a fifth generation 5G communication system, a base station in a future communication system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. The base station may include one or more co-site or non-co-site transmission reception points (transmission reception point, TRP). The network device may alternatively be a radio controller, a centralized unit (centralized unit, CU), a distributed unit (distributed unit, DU), or the like in a cloud radio access network (cloud radio access network, CRAN) scenario. The network device may alternatively be a server, a wearable device, a vehicle-mounted device, or the like. An example in which the network device is a base station is used for description below. The plurality of network devices may be base stations of a same type or base stations of different types. In this embodiment of this application, the data transmission apparatus 101 is a receiver in backscatter communication, and the data transmission apparatus 101 may simultaneously communicate with the second tag 103 and the first tag 102, to improve spectrum usage efficiency of data.

The first tag 102 refers to a transmitter in backscatter communication, and the first tag 102 uses a manner (similar to wireless charging) of collecting a radio frequency signal in an environment to supply power. When there is the radio frequency signal in the environment, the first tag 102 stores energy sensed by an antenna into an energy storage device such as a capacitor. When the stored energy reaches a threshold, the first tag 102 can start to work. Generally, only a milliwatt-level sensor can be driven by the first tag 102. The first tag 102 transmits a signal in a manner of controlling an impedance of a transmit antenna, and the data transmission apparatus 101 may receive a signal reflected by the first tag 102.

In some embodiments of this application, the second tag 103 may be a tag in backscatter communication, that is, the second tag 103 is another tag different from the first tag. In this case, the data transmission apparatus 101 may implement data transmission with the first tag and the second tag, to improve spectrum usage efficiency of data.

The second tag 103 may belong to a terminal device. A process of backscatter communication between the data transmission apparatus and two tags is used as an example for description in subsequent embodiments. This is not limited in that, this embodiment of this application is also applicable to a process of backscatter communication between the data transmission apparatus and one tag (for example, the first tag 102) and one terminal device. For example, the terminal device may be the foregoing second tag 103. The terminal device is alternatively referred to as user equipment (user equipment, UE), a mobile station (mobile station, MS), a mobile terminal (mobile terminal, MT), a terminal, or the like, and is a device that provides voice and/or data connectivity for a user, or a chip disposed in the device, for example, a hand-held device or a vehicle-mounted device with a wireless connection function. Currently, for example, the terminal device is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

Figure 2:
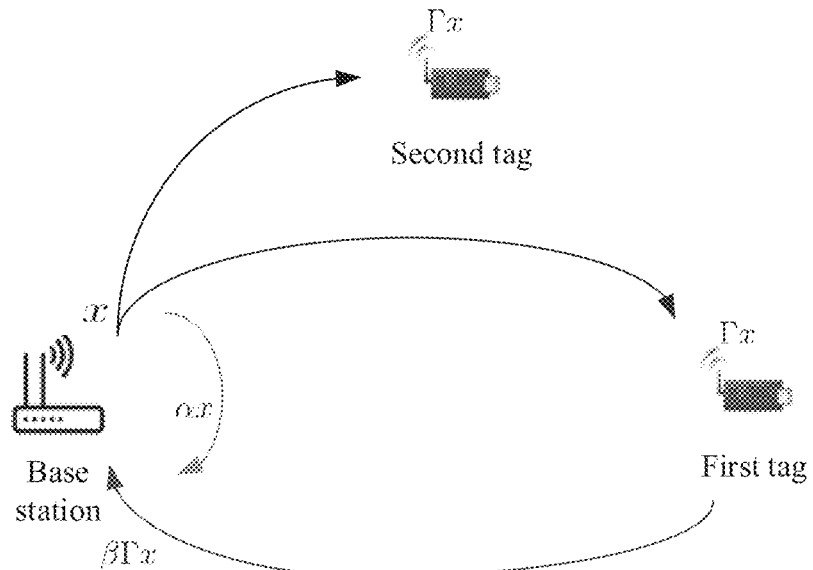
FIG. 2 is a schematic diagram of an application scenario of backscatter communication according to an embodiment of this application.

FIG. 2 is a schematic diagram of an application scenario of backscatter communication according to an embodiment of this application. A data transmission apparatus is specifically a base station, and the base station may simultaneously communicate with a second tag and a first tag. A radio frequency signal source and a receiver are located on one physical device (that is, a base station). An excitation signal sent by the base station is represented by x, and a tag reflection coefficient of the first tag is $\Gamma$. In this case, a signal received by the base station may be represented by $y=\alpha x + \beta \Gamma x$.

x is the excitation signal sent by the base station, and y is the signal received by the base station.

$\alpha x$ is interference caused by the excitation signal sent by the base station to the received signal. Because the first tag reflects the signal sent by the base station to implement communication, the base station performs sending when receiving the excitation signal, thereby causing self-interference.

$\Gamma x$ is the signal reflected by the first tag, and $\beta$ is attenuation of the signal reflected by the excitation signal sent from the base station to the first tag, and then reflected back by the first tag to the base station.

Figure 3:
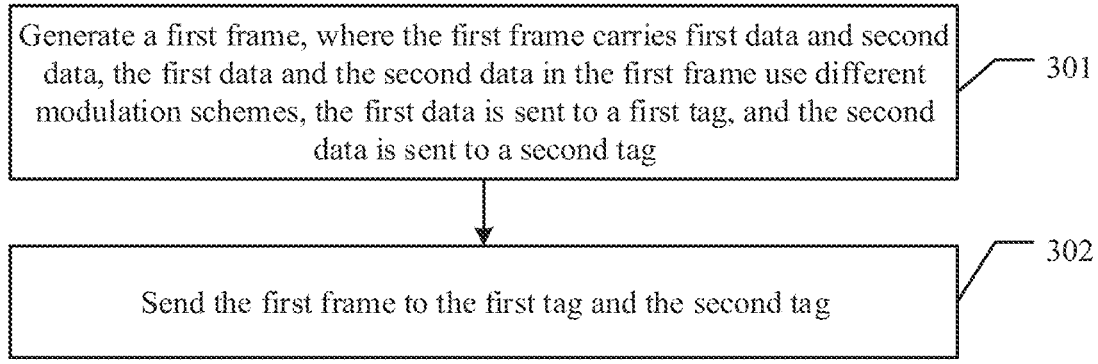
FIG. 3 is a schematic block flowchart of a data transmission method in backscatter communication according to an embodiment of this application.

The following describes, from a perspective of a data transmission apparatus, a data transmission method in backscatter communication according to an embodiment of this application. FIG. 3 is a data transmission method in backscatter communication according to an embodiment of this application. The method mainly includes the following steps.

301: Generate a first frame, where the first frame carries first data and second data, the first data and the second data in the first frame use different modulation schemes, the first data is sent to a first tag, and the second data is sent to a second tag.

In this embodiment of this application, a data transmission apparatus may communicate with the second tag and the first tag at the same time. The data transmission apparatus determines the first data that needs to be sent to the first tag, and determines the second data that needs to be sent to the second tag. The first data may be one or more data blocks, or the first data may be a data flow. The second data may be one or more data blocks, or the second data may be a data flow. A difference between the first data and the second data lies in that receivers of received data are different, and data composition of the first data and the second data may be configured by the data transmission apparatus based on a specific application scenario.

After the data transmission apparatus determines the first data and the second data, the data transmission apparatus may generate the first frame based on the first data and the second data. The first data and the second data in the first frame use the different modulation schemes. For example, the first data uses a first modulation scheme, and the second data uses a second modulation scheme. The data transmission apparatus may carry both the first data and the second data in the first frame by using the two different modulation schemes. A frame structure composition manner of the first frame is not limited herein.

In some embodiments of this application, the first frame includes a result obtained after a multiplication operation is performed on the first data and the second data. The data transmission apparatus may perform the multiplication operation on the first data and the second data to obtain the multiplication result. The first frame includes the multiplication result. For example, if the first data is $s_1$, and the second data is $s_2$, the result obtained by performing the multiplication operation on the first data and the second data is s, and the following relationship is met: $s=s_1 \times s_2$. The first frame may include the result s. In this embodiment of this application, the data transmission apparatus performs the multiplication operation on the first data and the second data, and the first frame generated by the data transmission apparatus carries a multiplication result, so that the first frame can carry both the first data and the second data.

Figure 4A:
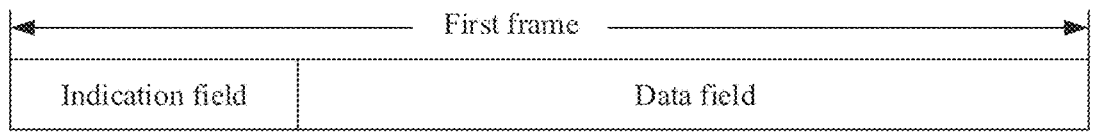
FIG. 4a is a schematic diagram of a frame structure of a first frame according to an embodiment of this application.

Refer to FIG. 4a, the first frame includes an indication field and a data field in some embodiments of this application.

The indication field is used to indicate modulation schemes respectively used by the first data and the second data.

The data field is used to carry the first data and the second data.

Specifically, the first frame generated by a data transmission apparatus includes at least two fields: the indication field and the data field. The indication field indicates modulation schemes respectively used by the first data and the second data, and the data field carries both the first data and the second data. The first frame generated by the data transmission apparatus includes the indication field, so that the first tag and the second tag determine, by parsing the indication field, a modulation scheme corresponding to data that needs to be respectively received. Therefore, the first tag and the second tag may demodulate the data field by using respective corresponding modulation schemes. The first tag may obtain the first data from the data field, and the second tag may obtain the second data from the data field. Therefore, the first tag and the second tag as data receivers may separately obtain downlink data sent by the data transmission apparatus to the first tag and the second tag, thereby implementing simultaneous communication between the data transmission apparatus and the first tag and the second tag. This can improve spectrum usage efficiency of the data.

It should be noted that, in an actual application, the indication field may indicate, by using one field, the modulation schemes respectively used by the first data and the second data. It is not limited that the indication field may further include two indication subfields. One indication subfield indicates the modulation scheme used by the first data, and the other indication subfield indicates the modulation scheme used by the second data. This is not limited herein. In addition, there may be a plurality of data fields. Some data fields are used to carry the first data, and some other data fields are used to carry the second data. This is not limited herein.

Further, in some embodiments of this application, the indication field in the first frame is further used to indicate a transmission rate used for the first data and a transmission rate used for the second data.

The data transmission apparatus may further indicate a transmission rate of each type of data by using the indication field. For example, the indication field indicates a transmission rate used for the first data and further indicates a transmission rate used for the second data, so that the first tag and the second tag parse the indication field to determine a transmission rate corresponding to each data that needs to be received. Therefore, the first tag and the second tag may receive the data field by using respective corresponding transmission rates. The first tag may obtain the first data from the data field, and the second tag may obtain the second data from the data field. Therefore, the first tag and the second tag as data receivers may separately obtain downlink data sent by the data transmission apparatus to the first tag and the second tag, thereby implementing simultaneous communication between the data transmission apparatus and the first tag and the second tag. This can improve spectrum usage efficiency of the data.

In some embodiments of this application, the transmission rate of the second data is N times the transmission rate of the first data, and N is a positive integer greater than or equal to 1.

The first frame carries the first data and the second data, and the transmission rate of the second data is N times the transmission rate of the first data. For example, the first data is $s_1$, the transmission rate of the first data is $v_1$, the second data is $s_2$, the transmission rate of the second data is $v_2$, the transmission rate $v_2$ of $s_2$ is equal to the transmission rate $v_1$ of $s_1$, or the transmission rate $v_2$ of $s_2$ is an integer multiple of the transmission rate $v_1$ of $s_1$, that is $v_2=N_{x_1}$, where N is an integer greater than or equal to 2. In embodiments of this application, the first tag and the second tag may receive the data field by using the respective corresponding transmission rates. The first tag may obtain the first data from the data field, and the second tag may obtain the second data from the data field.

Figure 4B:
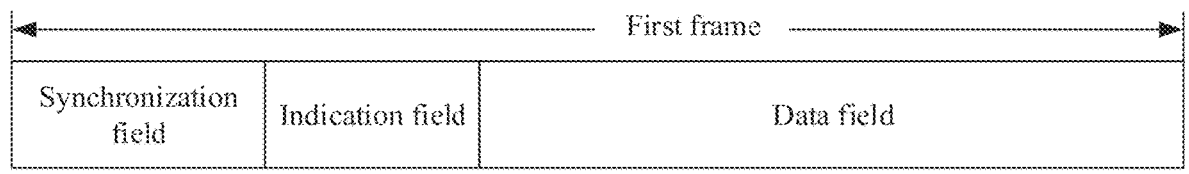
FIG. 4b is a schematic diagram of a frame structure of another first frame according to an embodiment of this application.

Refer to FIG. 4b, in some embodiments of this application, the first frame further includes a synchronization field.

The synchronization field is used to synchronously receive the first frame by the first tag and the second tag.

Specifically, in addition to the indication field and the data field, the first frame generated by the data transmission apparatus may further include the synchronization field. The synchronization field is located in a header of the first frame, so that the first tag and the second tag determine respective moments at which data needs to be received by using the synchronization field. Therefore, the first tag and the second tag may receive the indication field and the data field at the respective corresponding moments. The first tag and the second tag then demodulate the data field. The first tag may obtain the first data from the data field, and the second tag may obtain the second data from the data field. Therefore, the first tag and the second tag as data receivers may separately obtain downlink data sent by the data transmission apparatus to the first tag and the second tag, thereby implementing simultaneous communication between the data transmission apparatus and the first tag and the second tag. This can improve spectrum usage efficiency of the data.

For example, the synchronization field may be a short training frame (short training frame, STF), and the data transmission apparatus may implement tag synchronization by using the synchronization field. A location and a length of the synchronization field in the first frame may be flexibly configured by the data transmission apparatus. This is not limited herein.

In some embodiments of this application, the first data and the second data in the first frame use the different modulation schemes. For example, the first data uses the first modulation scheme, and the second data uses the second modulation scheme. The data transmission apparatus may use the first frame to carry both the first data and the second data by using the two different modulation schemes, so that the first tag receiving the first data and the second tag receiving the second data may identify, by using the respective corresponding modulation schemes, respective data sent by the data transmission apparatus.

Figure 5A:
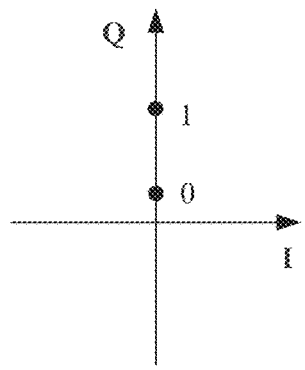
FIG. 5a is a schematic diagram of amplitude modulation according to an embodiment of this application.

In this embodiment of this application, the data transmission apparatus modulates the data by using a plurality of schemes. For example, a modulation scheme used by the data transmission apparatus includes amplitude modulation and phase modulation. FIG. 5a is a schematic diagram of amplitude modulation according to an embodiment of this application. Information about different data is transmitted at different amplitudes, and this is also referred to as amplitude modulation. In two-order amplitude modulation shown in FIG. 5a, a high amplitude of a sent signal represents data of a bit 1, and a low amplitude of a sent signal represents data of a bit 0. For example, the amplitude modulation used in this embodiment of this application may be amplitude shift keying (amplitude shift keying, ASK). For example, the ASK may include on-off keying (on-off keying, OOK), and the OOK may also be referred to as binary amplitude shift keying (2ASK).

Figure 5B:
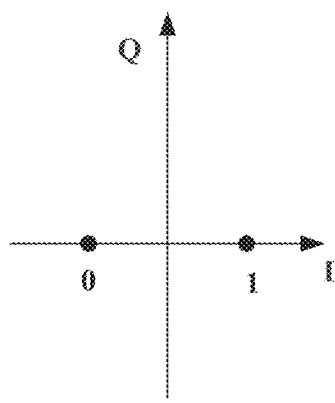
FIG. 5b is a schematic diagram of phase modulation according to an embodiment of this application.

FIG. 5b is a schematic diagram of phase modulation according to an embodiment of this application. Information about different data is transmitted in different phases, and this is also referred to as phase modulation. The phase modulation shown in FIG. 5b is binary phase shift keying (binary phase shift keying, BPSK). When a sent signal is +1 (phase is 0), it indicates data of a bit. When a sent signal is −1 (phase is π), it indicates data of a bit 0. It is not limited to that, phase modulation used in this embodiment of this application is not limited to BPSK. For example, phase modulation may alternatively be differential modulation, for example, differential coherent binary phase shift keying (differentially coherent binary PSK, DBPSK). When a phase difference between symbols before and after a sent signal is 0, it indicates data of a bit 1. When a phase difference between the symbols before and after a sent signal is π, it indicates data of a bit 0.

In some embodiments of this application, the first data uses phase modulation, and the second data uses amplitude modulation.

Alternatively, the first data uses phase modulation, and the second data uses amplitude modulation.

Alternatively, both the first data and the second data use amplitude modulation, and the first data and the second data have different amplitude values.

After the data transmission apparatus determines the first data that needs to be sent to the first tag and the second data that needs to be sent to the second tag, the data transmission apparatus may modulate the first data and the second data, to generate the first frame. The first data and the second data in the first frame use different modulation schemes. For example, one of the two pieces of data (that is, the first data and the second data) uses amplitude modulation, and the other piece of data uses phase modulation. In this case, modulation schemes are different, so that the first tag and the second tag determine a modulation scheme corresponding to each data that needs to be received. Therefore, the first tag and the second tag may demodulate the first frame by using respective corresponding modulation schemes. The first tag may obtain the first data from the first frame, and the second tag may obtain the second data from the first frame. Therefore, the first tag and the second tag as data receivers may separately obtain downlink data sent by the data transmission apparatus to the first tag and the second tag, thereby implementing simultaneous communication between the data transmission apparatus and the first tag and the second tag. This can improve spectrum usage efficiency of the data.

For another example, both two pieces of data (that is, the first data and the second data) use amplitude modulation, but have different amplitude values. Therefore, the first tag and the second tag may demodulate the first frame by using the respective corresponding amplitude values. The first tag may obtain the first data from the first frame, and the second tag may obtain the second data from the first frame. Therefore, the first tag and the second tag as data receivers may separately obtain downlink data sent by the data transmission apparatus to the first tag and the second tag, thereby implementing simultaneous communication between the data transmission apparatus and the first tag and the second tag. This can improve spectrum usage efficiency of the data.

302: Send the first frame to the first tag and the second tag.

In this embodiment of this application, after the data transmission apparatus generates the foregoing first frame, the data transmission apparatus may send the first frame to both the first tag and the second tag. In other words, the first frame sent by the data transmission apparatus may be received by the first tag, and the first frame may also be received by the second tag. Therefore, the data transmission apparatus only needs to send the first frame, and both the first tag and the second tag may receive the first frame. The first data and the second data in the first frame use different modulation schemes, so that the first tag can obtain the first data from the first frame, the second tag may obtain the second data from the first frame, and data is sent to the first tag and the second tag at the same time. This can improve spectrum usage efficiency of data.

It can be learned from an example of the foregoing embodiment that, in this embodiment of this application, the first frame is generated, where the first frame carries the first data and the second data. The first data and the second data in the first frame use the different modulation schemes. The first data is sent to the first tag, and the second data is sent to the second tag. Then, the first frame is sent to the first tag and the second tag. In this embodiment of this application, the first frame may be sent to both the first tag and the second tag. The first data and the second data in the first frame use different modulation schemes, so that the first tag can obtain the first data from the first frame, the second tag may obtain the second data from the first frame, and data is sent to the first tag and the second tag at the same time. This can improve spectrum usage efficiency of the data.

Figure 6:
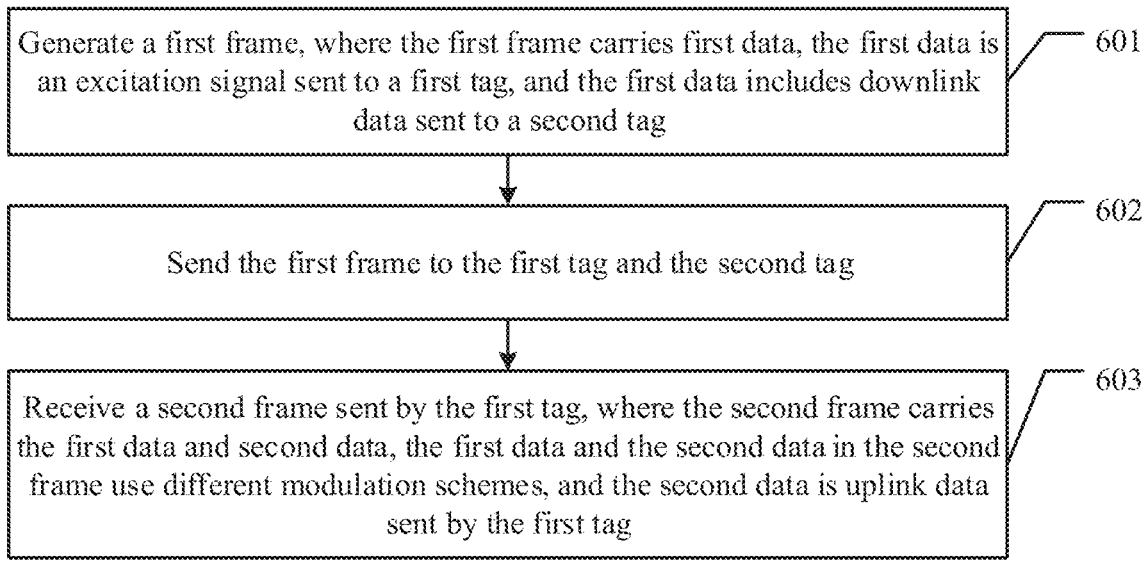
FIG. 6 is a schematic block flowchart of another data transmission method in backscatter communication according to an embodiment of this application.

The following describes, from a perspective of a data transmission apparatus, another data transmission method in backscatter communication according to an embodiment of this application. FIG. 6 is a data transmission method in backscatter communication according to an embodiment of this application. The method mainly includes the following steps.

601: Generate a first frame, where the first frame carries first data, the first data is an excitation signal sent to a first tag, and the first data includes downlink data sent to a second tag.

In this embodiment of this application, a data transmission apparatus may communicate with the second tag. The data transmission apparatus determines the downlink data sent to the second tag. For example, the downlink data may be service data sent by the data transmission apparatus to the second tag, or the downlink data may be downlink scheduling instructions sent by the data transmission apparatus to the second tag. The first data may be one or more data blocks, or the first data may be a data flow. Data composition of the first data may be configured by the data transmission apparatus based on a specific application scenario.

In this embodiment of this application, when the data transmission apparatus may communicate with the second tag, the data transmission apparatus may further communicate with the first tag at the same time. The first data generated by the data transmission apparatus may be further used as the excitation signal sent by the data transmission apparatus to the first tag, so that the data transmission apparatus may perform backscatter communication with the first tag.

Figure 7A:
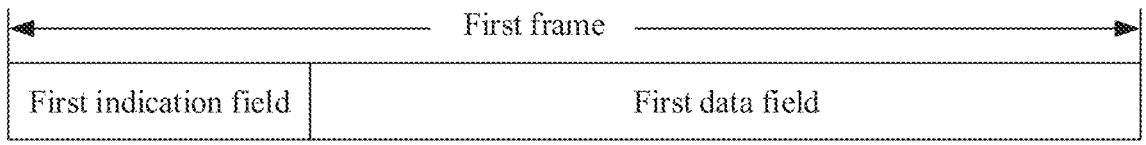
FIG. 7a is a schematic diagram of a frame structure of another first frame according to an embodiment of this application.

Refer to FIG. 7a, in some embodiments of this application, the first frame includes a first indication field and a first data field.

The first indication field is used to indicate a modulation scheme used by the first data.

The first data field is used to carry the first data.

Specifically, the first frame generated by a data transmission apparatus includes at least two fields: the first indication field and the first data field. The first indication field indicates the modulation scheme used by the first data, and the first data field carries the first data. The first frame generated by the data transmission apparatus includes the first indication field, so that the first tag and the second tag determine, by parsing the first indication field, a modulation scheme corresponding to the first data that needs to be received. Therefore, the first tag and the second tag may demodulate the first data field by using the modulation scheme corresponding to the first data. Both the first tag and the second tag may obtain the first data from the first data field, but manners of using the first data by the first tag and the second tag are different. It can be learned from subsequent descriptions that the first tag uses the first data as the excitation signal, and then the first tag may reflect the second frame to the data transmission apparatus. The data transmission apparatus may receive the second frame. The data transmission apparatus implements uplink and downlink communication with the first tag. This can improve spectrum usage efficiency of the data. In addition, the second tag may parse the first data, to obtain downlink data sent by the data transmission apparatus to the second tag. For example, the second tag may obtain data content of the downlink data, or the second tag may respond to the downlink data and execute downlink instructions of the data transmission apparatus.

In some embodiments of this application, the first indication field is further used to indicate a transmission rate of the first data.

The data transmission apparatus may further indicate the transmission rate of the first data by using the first indication field. For example, the first indication field indicates the transmission rate used for the first data, so that the first tag and the second tag determine, by parsing the first indication field, a transmission rate corresponding to respective first data that needs to be received. Therefore, the first tag and the second tag may demodulate the first data field by using the modulation scheme corresponding to the first data. Both the first tag and the second tag may obtain the first data from the first data field, but manners of using the first data by the first tag and the second tag are different. It can be learned from subsequent descriptions that the first tag uses the first data as the excitation signal, and then the first tag may reflect the second frame to the data transmission apparatus. The data transmission apparatus may receive the second frame. The data transmission apparatus implements uplink and downlink communication with the first tag. This can improve spectrum usage efficiency of the data.

602: Send the first frame to the first tag and the second tag.

In this embodiment of this application, after the data transmission apparatus generates the foregoing first frame, the data transmission apparatus may send the first frame to both the first tag and the second tag. In other words, the first frame sent by the data transmission apparatus may be received by the first tag, and the first frame may also be received by the second tag. Therefore, the data transmission apparatus only needs to send the first frame, both the first tag and the second tag may receive the first frame, and both the first tag and the second tag may obtain the first data from the first frame. However, manners of using the first data by the first tag and the second tag are different. It can be learned from subsequent descriptions that the first tag uses the first data as the excitation signal, and then the first tag may reflect a second frame to the data transmission apparatus, and the data transmission apparatus may receive the second frame. The data transmission apparatus implements uplink and downlink communication with the first tag. This can improve spectrum usage efficiency of data. In addition, the second tag may parse the first data, to obtain downlink data sent by the data transmission apparatus to the second tag. For example, the second tag may obtain data content of the downlink data, or the second tag may respond to the downlink data and execute downlink instructions of the data transmission apparatus.

603: Receive the second frame sent by the first tag, where the second frame carries the first data and second data, the first data and the second data in the second frame use different modulation schemes, and the second data is uplink data sent by the first tag.

In this embodiment of this application, the first frame sent by the data transmission apparatus to the first tag carries the first data, the first tag uses the first data as the excitation signal, and the first tag needs to send the second data to the data transmission apparatus. In this case, the first tag may generate the second frame, and the second frame carries both the first data and the second data. The first data and the second data in the second frame use the different modulation schemes. The first tag may reflect the second frame to the data transmission apparatus, and the data transmission apparatus identifies, from the second frame based on the modulation schemes used by the first data and the second data, that the first data is the excitation signal. The second data is the uplink data sent by the first tag. The data transmission apparatus implements uplink and downlink communication with the first tag. This can improve spectrum usage efficiency of the data.

In this embodiment of this application, the first tag may generate the second frame based on the first data and the second data, where the first data and the second data in the second frame use the different modulation schemes. For example, the first data uses a first modulation scheme, and the second data uses a second modulation scheme. The first tag may carry both the first data and the second data in the second frame by using the two different modulation schemes. A frame structure composition manner of the second frame is not limited herein.

Figure 7B:
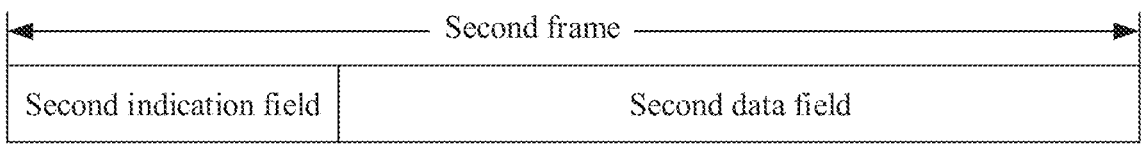
FIG. 7b is a schematic diagram of a frame structure of a second frame according to an embodiment of this application.

Refer to FIG. 7b, in some embodiments of this application, the second frame includes a second indication field and a second data field.

The second indication field is used to indicate the modulation schemes respectively used by the first data and the second data.

The second data field is used to carry the first data and the second data.

Specifically, the second frame generated by the first tag includes at least two fields: the second indication field and the second data field. The second indication field indicates the modulation schemes respectively used by the first data and the second data, and the second data field carries the first data and the second data. The second frame generated by the first tag includes the second indication field, so that the data transmission apparatus determines, by parsing the second indication field, the modulation scheme corresponding to the first data that needs to be received. Therefore, the data transmission apparatus may demodulate the second data field by using the modulation scheme corresponding to the first data. The data transmission apparatus may obtain the first data from the second data field. In addition, the data transmission apparatus determines, by parsing the second indication field, the modulation scheme corresponding to the second data that needs to be received. Therefore, the data transmission apparatus may demodulate the second data field by using the modulation scheme corresponding to the second data, and the data transmission apparatus may obtain the second data from the second data field. The data transmission apparatus implements uplink and downlink communication with the first tag. This can improve spectrum usage efficiency of the data.

It should be noted that, in an actual application, the second indication field may indicate, by using one field, the modulation schemes respectively used by the first data and the second data. It is not limited that the second indication field may further include two indication subfields. One indication subfield indicates the modulation scheme used by the first data, and the other indication subfield indicates the modulation scheme used by the second data. This is not limited herein. In addition, there may be a plurality of second data fields. Some data fields are used to carry the first data, and some other data fields are used to carry the second data. This is not limited herein.

In some embodiments of this application, the second indication field is further used to indicate a transmission rate used for the first data and a transmission rate used for the second data.

The second frame may further indicate a transmission rate of each type of data by using the second indication field. For example, the second indication field indicates the transmission rate used for the first data and further indicates the transmission rate used for the second data, so that the data transmission apparatus determines, by parsing the second indication field, a transmission rate corresponding to each type of data that needs to be received. Therefore, the data transmission apparatus may receive the second data field by using different data transmission rates. The data transmission apparatus may obtain the first data from the second data field, and the data transmission apparatus may obtain the second data from the second data field. Therefore, the data transmission apparatus implements uplink and downlink communication with the first tag. This can improve spectrum usage efficiency of the data.

In some embodiments of this application, the transmission rate of the second data is N times the transmission rate of the first data, and N is a positive integer greater than or equal to 1.

The second frame carries the first data and the second data, and the transmission rate of the second data is N times the transmission rate of the first data. For example, the first data is $s_1$, the transmission rate of the first data is $v_1$, the second data is $s_2$, the transmission rate of the second data is $v_2$, the transmission rate $v_2$ of $s_2$ is equal to the transmission rate $v_1$ of $s_1$, or the transmission rate $v_2$ of $s_2$ is an integer multiple of the transmission rate $v_1$ of $s_1$, that is $v_2=Nv_1$, where N is an integer greater than or equal to 2. In this embodiment of this application, the data transmission apparatus may receive the second data field by using the different data transmission rates. The transmission rates of the first data and the second data meet an N-times relationship. The data transmission apparatus may obtain the first data from the second data field, and the data transmission apparatus may obtain the second data from the second data field. Therefore, different data is transmitted in the second frame at different transmission rates, and the data transmission apparatus receives the first data and the second data from the second frame.

In some embodiments of this application, the first data and the second data in the first frame use the different modulation schemes. For example, the first data uses the first modulation scheme, and the second data uses the second modulation scheme. The first tag may put both the first data and the second data in the second frame by using the two different modulation schemes, so that the data transmission apparatus identifies, from the second frame, the excitation signal and the uplink data sent by the first tag.

In some embodiments of this application, the first data uses phase modulation, and the second data uses amplitude modulation; or the first data uses phase modulation, and the second data uses amplitude modulation; or both the first data and the second data use amplitude modulation, and the first data and the second data have different amplitude values.

After the first tag determines that the first data is used for the excitation signal and the second data is the uplink data that needs to be sent to the data transmission apparatus, the first tag may modulate the first data and the second data, to generate the second frame. The first data and the second data in the second frame use different modulation schemes. For example, one of the two pieces of data (that is, the first data and the second data) uses amplitude modulation, and the other data uses phase modulation. The first tag may carry both the first data and the second data in the second frame by using two different modulation schemes, so that the data transmission apparatus identifies, from the second frame, the excitation signal and the uplink data sent by the first tag. The data transmission apparatus implements uplink and downlink communication with the first tag. This can improve spectrum usage efficiency of the data.

For another example, both two pieces of data (that is, the first data and the second data) use amplitude modulation, but have different amplitude values. Therefore, the data transmission apparatus may demodulate the second frame by using the respective corresponding amplitude values. The data transmission apparatus obtains the first data and the second data from the second frame. The data transmission apparatus implements uplink and downlink communication with the first tag. This can improve spectrum usage efficiency of the data.

In some embodiments of this application, the first data is broadcast data; or the first data is unicast data sent to the second tag.

If the first data sent by the data transmission apparatus to the second tag is the broadcast data, the second tag may receive the broadcast data, and another second tag in a communication network may also receive the broadcast data. In addition, if the first data is the unicast data sent to a second tag, the second tag may obtain the unicast data sent by the data transmission apparatus. For example, the unicast data may be service data sent to the second tag, or downlink scheduling instructions sent to the second tag. For example, the second tag may be a second tag, the first data may be downlink scheduling instructions sent to the second tag. After the second tag obtains the first data from the first frame, the second tag may also send the uplink data of the second tag to the data transmission apparatus based on the downlink scheduling instructions of the data transmission apparatus.

It can be learned from an example of the foregoing embodiment that, in this embodiment of this application, a first frame is first generated, where the first frame carries the first data. The first data is the excitation signal sent to the first tag, and the first data includes the downlink data sent to the second tag. Then, the first frame is sent to the first tag and the second tag. Finally, the second frame sent by the first tag is received, where the second frame carries first data and second data, the first data and the second data in the second frame use the different modulation schemes, and the second data is the uplink data sent by the first tag. In this embodiment of this application, the first frame may be sent to both the first tag and the second tag, so that the first tag may reflect the first data as the excitation signal, and the second frame reflected by the first tag carries the second data. In addition, the second tag may obtain the first data from the first frame, thereby implementing uplink and downlink communication with the first tag, and improving spectrum usage efficiency of data.

To better understand and implement the foregoing solutions in embodiments of this application, the following uses corresponding application scenarios as examples for specific description.

Figure 8:
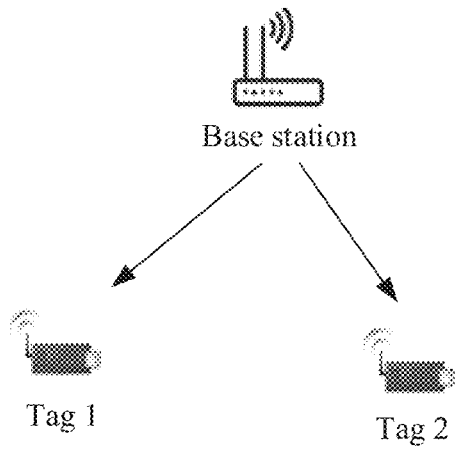
FIG. 8 is a schematic diagram of a specific implementation architecture of a back reflection communication system according to an embodiment of this application.

FIG. 8 is a schematic diagram of a specific implementation architecture of a back reflection communication system according to an embodiment of this application. The back reflection communication system may include a base station, a tag 1, and a tag 2. For example, the base station may be an implementation form of the foregoing data transmission apparatus, the tag 1 may be an implementation form of the foregoing first tag, and the tag 2 may be an implementation form of the foregoing second tag. In this embodiment of this application, optimization of an excitation signal is introduced, In this embodiment of this application, the excitation signal that carries both phase information and amplitude information is sent, so that information is sent to two tags at the same time, or a function of simultaneous uplink and downlink communication is implemented.

As shown in FIG. 8, this embodiment of this application is mainly applied to an Internet of Things (internet of things, IoT) network based on backscatter communication. A tag reflects the excitation signal sent by the base station to transmit uplink information, and the base station demodulates information reflected by the tag. It is not limited that this embodiment of this application is further applicable to a scenario in which the base station communicates with a terminal device (user equipment, UE).

The base station in this embodiment of this application is first described. The base station may be an IoT base station, also referred to as a card reader. The IoT base station needs to send a downlink excitation signal for the tag to reflect and transmit the uplink information. The tag in this embodiment of this application may be used for backscatter communication, and different information is transmitted by selecting different matching circuits.

Figure 9A:
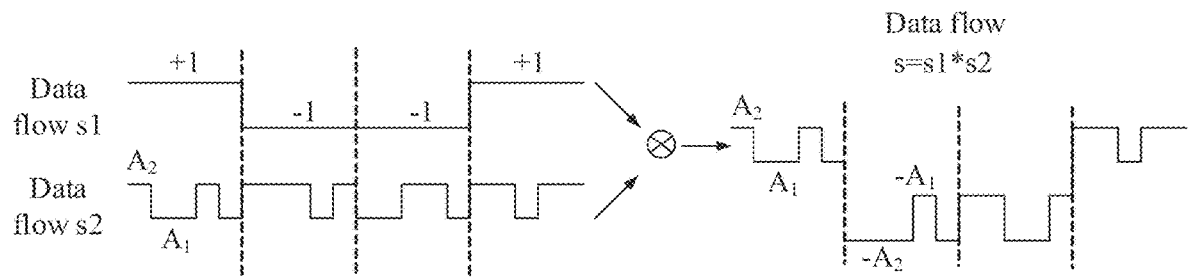
FIG. 9a is a schematic diagram of transmitting both amplitude information and phase information in an excitation signal according to an embodiment of this application.

FIG. 9a is a schematic diagram of transmitting both amplitude information and phase information in an excitation signal according to an embodiment of this application. In this embodiment of this application, both phase information and amplitude information are transmitted in an excitation signal, to implement downlink multi-flow data communication or uplink and downlink multi-flow data communication.

Signals of two flows sent by a base station are a data flow $s_1$ and a data flow $s_2$, where the $s_1$ uses BPSK modulation, a transmission rate of the $s_1$ is $v_1$, a corresponding length of each timeslot is $T_1$, and a transmitted signal is +1 or −1. $s_2$ uses amplitude modulation, a transmission rate of the $s_2$ is $v_2$, a length of each corresponding timeslot is $T_2$, and a transmitted signal is $A_1$ or $A_2$, where $A_2 > A_1$.

In a possible implementation, the transmission rate $v_2$ of the $s_2$ is an integer multiple of the transmission rate $v_1$ of the $s_1$, that is, $v_2 = Nv_1$, where N is an integer greater than or equal to 2. For example, in FIG. 9a, N=4, and $T_1 = 4*T_2$.

As shown in FIG. 9a, a sent data flow is $s = s_1 * s_2$, where * represents a multiplication relationship, or the multiplication relationship may also be represented as x. This is not limited herein.

For a received data flow $s_1$, $T_1$ may be a period to collect phase information in the period, to obtain information transmitted by the $s_1$. For a received data flow $s_1$, $T_2$ may be a period to collect amplitude in the period, to obtain information transmitted by the $s_2$.

Figure 9B:
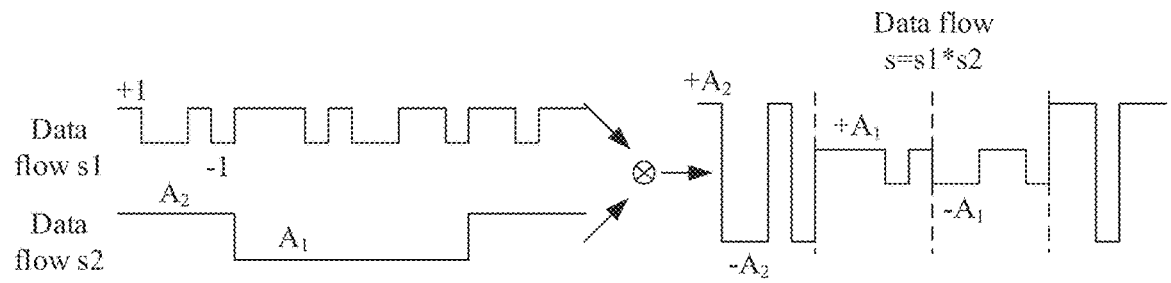
FIG. 9b is another schematic diagram of transmitting both amplitude information and phase information in an excitation signal according to an embodiment of this application.

FIG. 9b is another schematic diagram of transmitting both amplitude information and phase information in an excitation signal according to an embodiment of this application. FIG. 9b is similar to FIG. 9a, and a difference lies in that $v_1 = Nv_2$, where N is an integer greater than or equal to 2.

Figure 9C:
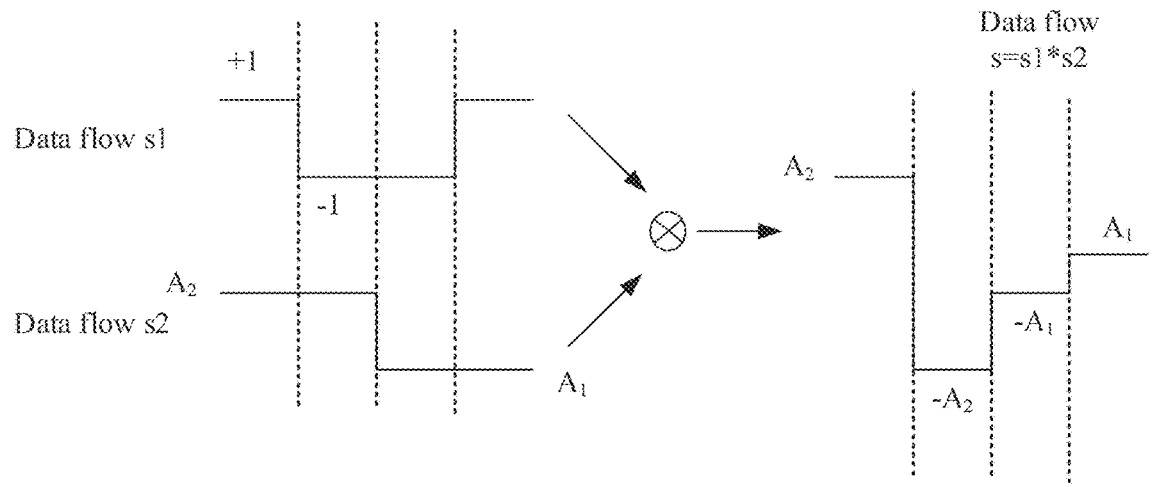
FIG. 9c is a schematic diagram of transmitting both amplitude information and phase information in an excitation signal according to an embodiment of this application.

FIG. 9c is a schematic diagram of transmitting both amplitude information and phase information in an excitation signal according to an embodiment of this application. The data flow $s_1$ uses phase modulation, and the data flow $s_2$ uses amplitude modulation. FIG. 9c is similar to FIG. 9a and FIG. 9b, but a difference lies in that $v_1 = v_2$.

For clarity of description, the following uses two different embodiments as examples. First, an embodiment is used to describe a method and a process in which a base station sends signals to two tags at the same time, and another embodiment is used to describe a method and a process in which a base station sends downlink information by using an excitation signal, and at the same time, a tag reflects the excitation signal to transmit uplink information.

Figure 10A:
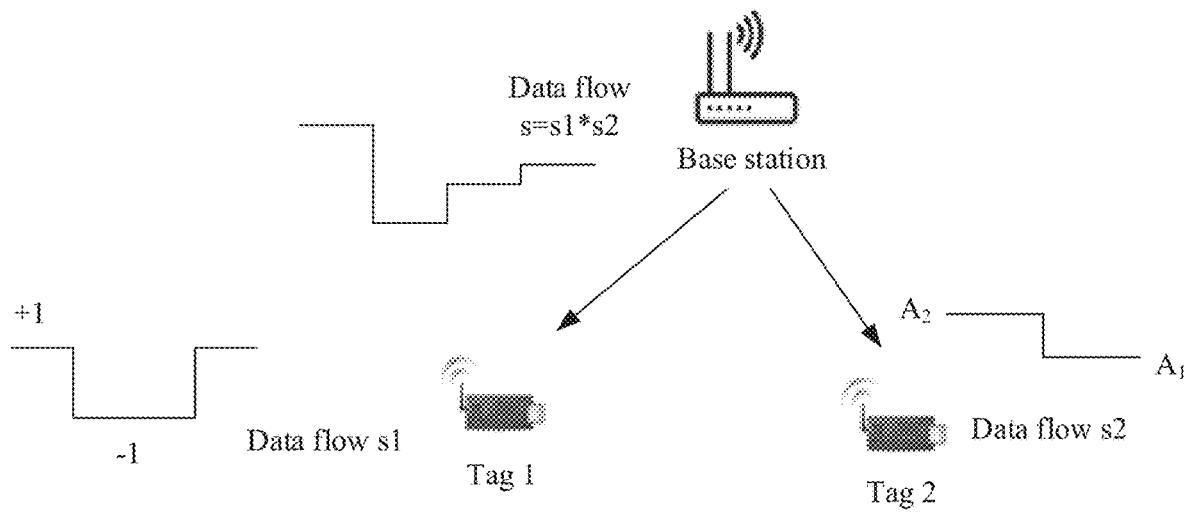
FIG. 10a is a schematic diagram of simultaneously sending signals by a base station to two tags according to an embodiment of this application.

First, a scenario in which a base station sends signals to two tags at the same time is described. FIG. 10a is a schematic diagram of sending signals by a base station to two tags at the same time according to an embodiment of this application. The base station sends data to the two tags at the same time. A data flow s1 is data to be sent to a tag 1, and a data flow s2 is data to be sent to a tag 2. One of the two flows uses BPSK modulation or DBPSK modulation, and the other flow uses amplitude modulation.

In a possible implementation, a rate of one flow is N times a rate of the other flow, where N is an integer greater than or equal to 1.

A signal sent by the base station is $s = s_1 \times s_2$, where × represents a multiplication relationship, and the tag 1 and the tag 2 obtain, based on different modulation schemes, data sent to the tag 1 and the tag 2 respectively by using a phase demodulation method or an amplitude demodulation method.

Figure 10B:
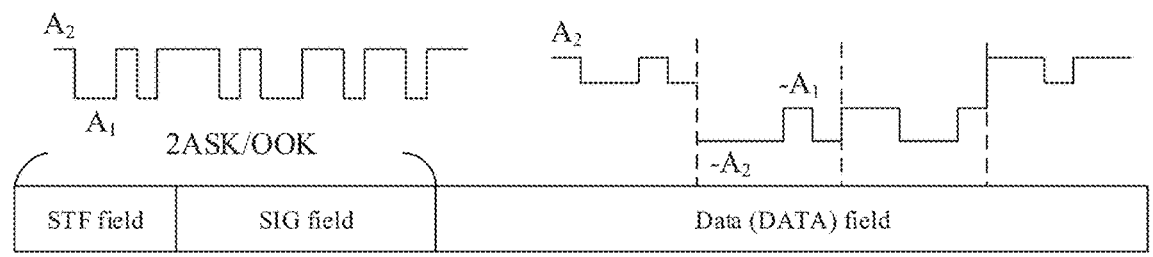
FIG. 10b is a schematic diagram depicting a frame structure of a signal sent by a base station according to an embodiment of this application.

FIG. 10b is a schematic diagram depicting a frame structure of a signal sent by a base station according to an embodiment of this application. The frame structure of the signal sent by the base station includes the following fields.

An STF field and an indication (SIG) field use OOK/2ASK modulation, and a subsequent data (DATA) field is used for sending $s = s_1 \times s_2$.

The STF field is used for tag synchronization, and the SIG field is used to indicate information such as a modulation scheme of a DATA part.

In this embodiment, the SIG field needs to indicate the following information: The DATA field sends data to two tags at the same time in a manner in this embodiment of this application; an identifier (ID) corresponding to the two tags; and a modulation scheme and a rate corresponding to each tag.

In this embodiment of this application, a to-be-sent signal carries both phase information and amplitude information, so that transmission efficiency can be improved. For example, the base station may send signals to the two tags at the same time. This can improve spectral efficiency.

The following describes a method and a procedure in which the base station sends downlink information by using an excitation signal, and a tag reflects the excitation signal to transmit uplink information. In a current back-reflection communication system, excitation signals sent by the base station are all based on a sine wave signal. The signals have advantages of stability and easy reflection, but a disadvantage is that the signals cannot carry downlink information, and transmission resources are wasted. For this scenario and problem, an embodiment of this application provides a solution in which the excitation signal carries the downlink information.

Figure 11A:
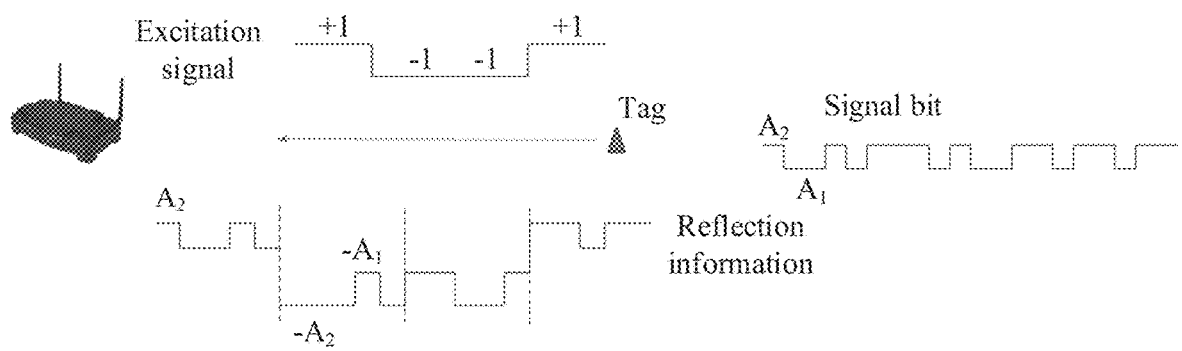
FIG. 11a is a schematic diagram of sending downlink information by a base station by using an excitation signal, and reflecting the excitation signal by one tag to transmit uplink information according to an embodiment of this application.

FIG. 11a is a schematic diagram of sending downlink information by a base station by using an excitation signal, and reflecting the excitation signal by one tag to transmit uplink information according to an embodiment of this application. The base station uses a data flow s1 as the excitation signal, and a signal bit sent by the tag is the data flow s2.

A signal flow reflected by the tag is $s=s_1 \times s_2$.

Similar to the foregoing embodiment, one of two flows uses BPSK modulation or DBPSK modulation, and the other flow uses amplitude modulation. For example, the s1 uses BPSK or DBPSK modulation, and the s2 uses OOK modulation.

For the base station, the signal bit sent by the tag are obtained by using an amplitude demodulation method.

In a possible implementation, the s1 may carry broadcast information or information sent to another tag. Correspondingly, another tag obtains information in the s1 by using a phase demodulation method.

Figure 11B:
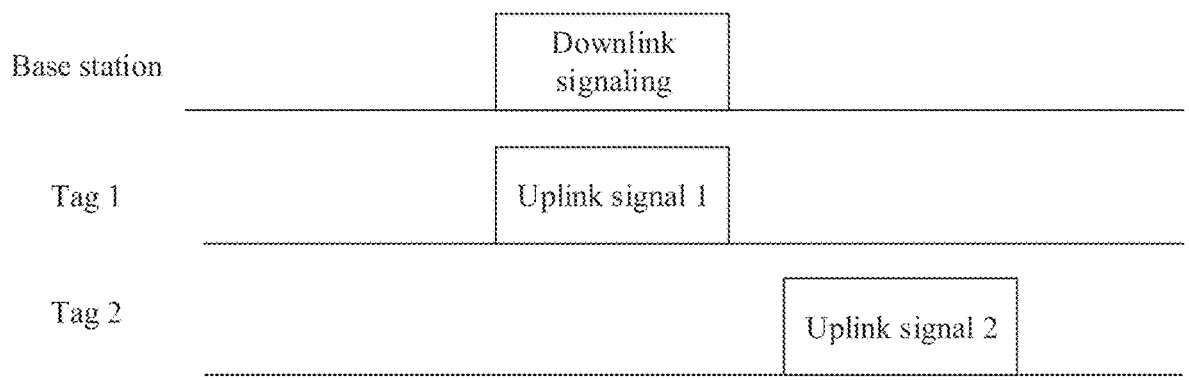
FIG. 11b is a schematic diagram of information transmission between a base station and two tags according to an embodiment of this application.

FIG. 11b is a schematic diagram of information transmission between a base station and two tags according to an embodiment of this application, and an interaction procedure is as follows.

The base station sends a downlink signaling to a tag 1, to instruct the tag 1 to send uplink information, the tag 1 reflects an excitation signal sent by the base station to send an uplink signal, and a tag 2 receives scheduling information included in the excitation signal sent by the base station, where the scheduling information is used to schedule the tag 2 to send the uplink information at a next moment. At the next moment, the tag 2 reflects, based on the received scheduling information, the excitation signal sent by the base station to the base station.

In this embodiment of this application, when sending the excitation signal, the base station adds broadcast information or information for another user to the excitation signal. This can improve spectral efficiency.

It should be noted that for ease of brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

To better implement the foregoing solutions in embodiments of this application, the following further provides a related apparatus for implementing the foregoing solutions.

Figure 12:
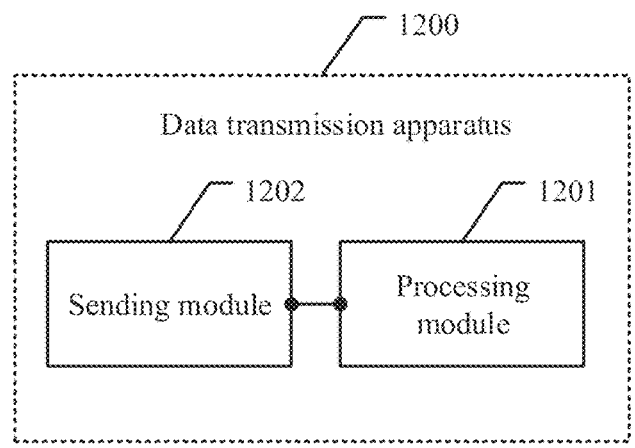
FIG. 12 is a schematic diagram depicting composition of a structure of a data transmission apparatus according to an embodiment of this application.

Refer to FIG. 12. A data transmission apparatus 1200 provided in an embodiment of this application may include a processing module 1201 and a sending module 1202.

The processing module 1201 is configured to generate a first frame, where the first frame carries first data and second data, the first data and the second data in the first frame use different modulation schemes, the first data is sent to a first tag, and the second data is sent to a second tag.

The sending module 1202 is configured to send the first frame to the first tag and the second tag.

In some embodiments of this application, the first frame includes an indication field and a data field.

The indication field is used to indicate modulation schemes respectively used by the first data and the second data.

The data field is used to carry the first data and the second data.

In some embodiments of this application, the indication field is further used to indicate a transmission rate used for the first data and a transmission rate used for the second data.

In some embodiments of this application, the transmission rate of the second data is N times the transmission rate of the first data, and N is a positive integer greater than or equal to 1.

In some embodiments of this application, the first frame further includes a synchronization field.

The synchronization field is used to synchronously receive the first frame by the first tag and the second tag.

In some embodiments of this application, the first data uses phase modulation, and the second data uses amplitude modulation; or the first data uses phase modulation, and the second data uses amplitude modulation; or both the first data and the second data use amplitude modulation, and the first data and the second data have different amplitude values.

In some embodiments of this application, the first frame includes a result obtained after a multiplication operation is performed on the first data and the second data.

It can be learned from an example of the foregoing embodiment that, in this embodiment of this application, the first frame is generated, where the first frame carries the first data and the second data. The first data and the second data in the first frame use the different modulation schemes. The first data is sent to the first tag, and the second data is sent to the second tag. Then, the first frame is sent to the first tag and the second tag. In this embodiment of this application, the first frame may be sent to both the first tag and the second tag. The first data and the second data in the first frame use different modulation schemes, so that the first tag can obtain the first data from the first frame, the second tag may obtain the second data from the first frame, and data is sent to the first tag and the second tag at the same time. This can improve spectrum usage efficiency of the data.

Figure 13:
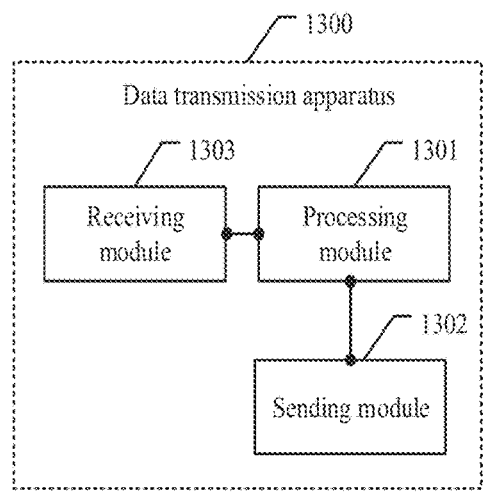
FIG. 13 is a schematic diagram depicting composition of a structure of another data transmission apparatus according to an embodiment of this application.

Refer to FIG. 13. A data transmission apparatus 1300 provided in an embodiment of this application may include a processing module 1301, a sending module 1302, and a receiving module 1303.

The processing module 1301 is configured to generate a first frame, where the first frame carries first data, the first data is an excitation signal sent to a first tag, and the first data includes downlink data sent to a second tag.

The sending module 1302 is configured to send the first frame to the first tag and the second tag.

The receiving module 1303 is configured to receive a second frame sent by the first tag, where the second frame carries the first data and second data, the first data and the second data in the second frame use different modulation schemes, and the second data is uplink data sent by the first tag.

In some embodiments of this application, the first frame includes a first indication field and a first data field.

The first indication field is used to indicate a modulation scheme used by the first data.

The first data field is used to carry the first data.

In some embodiments of this application, the first indication field is further used to indicate a transmission rate of the first data.

In some embodiments of this application, the second frame includes a second indication field and a second data field.

The second indication field is used to indicate modulation schemes respectively used by the first data and the second data.

The second data field is used to carry the first data and the second data.

In some embodiments of this application, the second indication field is further used to indicate a transmission rate used for the first data and a transmission rate used for the second data.

In some embodiments of this application, the transmission rate of the second data is N times the transmission rate of the first data, and N is a positive integer greater than or equal to 1.

In some embodiments of this application, the first data uses phase modulation, and the second data uses amplitude modulation; or the first data uses phase modulation, and the second data uses amplitude modulation; or both the first data and the second data use amplitude modulation, and the first data and the second data have different amplitude values.

In some embodiments of this application, the first data is broadcast data; or the first data is unicast data sent to the second tag.

In some embodiments of this application, the first data is the excitation signal sent to the first tag, and the first data includes the downlink data sent to the second tag.

It can be learned from an example of the foregoing embodiment that, in this embodiment of this application, a first frame is first generated, where the first frame carries the first data. The first data is the excitation signal sent to the first tag, and the first data includes the downlink data sent to the second tag. Then, the first frame is sent to the first tag and the second tag. Finally, the second frame sent by the first tag is received, where the second frame carries first data and second data, the first data and the second data in the second frame use the different modulation schemes, and the second data is the uplink data sent by the first tag. In this embodiment of this application, the first frame may be sent to both the first tag and the second tag, so that the first tag may reflect the first data as the excitation signal, and the second frame reflected by the first tag carries the second data. In addition, the second tag may obtain the first data from the first frame, thereby implementing uplink and downlink communication with the first tag, and improving spectrum usage efficiency of data.

It should be noted that content such as information exchange between the modules/units of the apparatus and the execution processes thereof is based on a same concept as the method embodiments of this application, and achieves same technical effects as the method embodiments of this application. For specific content, refer to the foregoing description in the method embodiments of this application. Details are not described herein again.

An embodiment of this application further provides a computer storage medium. The computer storage medium stores a program. The program is executed to perform some or all of the steps recorded in the method embodiments.

Figure 14:
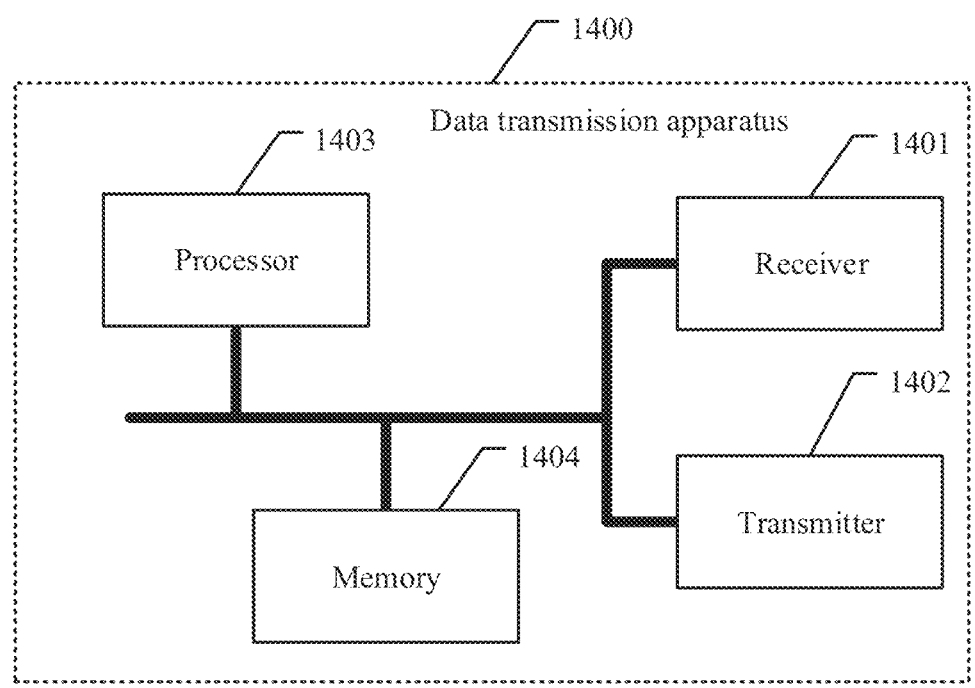
FIG. 14 is a schematic diagram depicting composition of a structure of still another data transmission apparatus according to an embodiment of this application.

The following describes another data transmission apparatus provided in an embodiment of this application. Refer to FIG. 14. The data transmission apparatus 1400 includes:

a receiver 1401, a transmitter 1402, a processor 1403, and a memory 1404 (there may be one or more processors 1403 in the data transmission apparatus 1400, and one processor is used as an example in FIG. 14). In some embodiments of this application, the receiver 1401, the transmitter 1402, the processor 1403, and the memory 1404 may be connected by using a bus or in another manner, and a connection by using the bus is used as an example in FIG. 14.

The memory 1404 may include a read-only memory and a random access memory, and provide instructions and data to the processor 1403. Apart of the memory 1404 may further include a non-volatile random access memory (non-volatile random access memory, NVRAM). The memory 1404 stores an operating system and operation instructions, an executable module or a data structure, a subset thereof, or an extended set thereof. The operation instructions may include various operation instructions to implement various operations. The operating system may include various system programs, to implement various basic services and process hardware-based tasks.

The processor 1403 controls an operation of the data transmission apparatus, and the processor 1403 may also be referred to as a central processing unit (central processing unit, CPU). In a specific application, components of the data transmission apparatus are coupled together by using a bus system. In addition to a data bus, the bus system includes a power bus, a control bus, and a status signal bus. However, for clear description, various types of buses in the figure are marked as the bus system.

The methods disclosed in embodiments of this application may be applied to the processor 1403 or may be implemented by the processor 1403. The processor 1403 may be an integrated circuit chip and has a signal processing capability. In an implementation process, steps in the foregoing methods can be implemented by using a hardware integrated logical circuit in the processor 1403, or by using instructions in a form of software. The processor 1403 may be a general-purpose processor, a digital signal processor (digital signal processing, DSP), an application-specific integrated circuit (application specific integrated circuit, ASIC), a field-programmable gate array (field-programmable gate array, FPGA) or another programmable logical device, a discrete gate or transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 1404, and the processor 1403 reads information in the memory 1404 and completes the steps in the foregoing methods in combination with hardware of the processor 1403.

The receiver 1401 may be configured to: receive input digit or character information, and generate signal input related to a related setting and function control of the data transmission apparatus. The transmitter 1402 may include a display device such as a display screen, and the transmitter 1402 may be configured to output digit or character information through an external interface.

In this embodiment of this application, the processor 1403 is configured to perform the data transmission methods in backscatter communication shown in FIG. 3 and FIG. 6.

In another possible design, when the data transmission apparatus is a chip, the chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the terminal performs the wireless communication method according to any one implementation of the first aspect. Optionally, the storage unit is a storage unit in the chip, for example, a register or a cache. Alternatively, the storage unit may be a storage unit that is in the terminal and that is located outside the chip, for example, a read-only memory (read-only memory, ROM) or another type of static storage device that may store static information and instructions, for example, a random access memory (random access memory, RAM).

The processor mentioned anywhere above may be a general-purpose central processing unit, a microprocessor, an ASIC, or one or more integrated circuits configured to control program execution of the method according to the first aspect.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected according to an actual need to achieve the objectives of the solutions of embodiments. In addition, in the accompanying drawings of the apparatus embodiments provided in this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, or a dedicated circuit. However, in this application, a software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a ROM, a RAM, a magnetic disk, or a CD-ROM of a computer, and includes several instructions for instructing a computer device (which may be a personal computer, a server, a network device, or the like) to perform the methods described in embodiments of this application.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on a computer, all or some of the procedures or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk or a magnetic tape), an optical medium (for example, a DVD), a semiconductor medium (for example, a solid state disk (Solid State Disk, SSD)), or the like.

What is claimed is:

1. A data transmission method in backscatter communication, the method comprising:
generating a first frame, wherein the first frame carries first data and second data, the first data and the second data in the first frame use different modulation schemes; and
sending the first frame to a first tag and a second tag, wherein the first data is obtained by the first tag and the second data is obtained by the second tag,
wherein:
the first data uses amplitude modulation, and the second data uses phase modulation; or
the first data uses phase modulation, and the second data uses amplitude modulation; or
both the first data and the second data use amplitude modulation, and the first data and the second data have different amplitude values.

2. The data transmission method according to claim 1, wherein the first frame comprises an indication field and a data field, wherein
the indication field is used to indicate modulation schemes respectively used by the first data and the second data; and
the data field is used to carry the first data and the second data.

3. The data transmission method according to claim 2, wherein the indication field is further used to indicate a transmission rate used for the first data and a transmission rate used for the second data.

4. The data transmission method according to claim 3, wherein the transmission rate of the second data is N times the transmission rate of the first data, and N is a positive integer greater than or equal to 1.

5. The data transmission method according to claim 2, wherein the first frame further comprises a synchronization field; and the synchronization field is used to receive the first frame by the first tag and the second tag synchronously.

6. The data transmission method according to claim 1, wherein the first frame comprises a result obtained after a multiplication operation is performed on the first data and the second data.

7. A data transmission apparatus, comprising:
at least one processor operable to generate a first frame, wherein the first frame carries first data and second data, the first data and the second data in the first frame use different modulation schemes; and
a transmitter operable to send the first frame to the first tag and the second tag, for the first data to be obtained by the first tag and the second data to be obtained by the second tag,
wherein:
the first data uses amplitude modulation, and the second data uses phase modulation; or
the first data uses phase modulation, and the second data uses amplitude modulation; or
both the first data and the second data use amplitude modulation, and the first data and the second data have different amplitude values.

8. The data transmission apparatus according to claim 7, wherein the first frame comprises an indication field and a data field, wherein
the indication field indicates modulation schemes respectively used by the first data and the second data; and
the data field carries the first data and the second data.

9. The data transmission apparatus according to claim 8, wherein the indication field further indicates a transmission rate for the first data and a transmission rate for the second data.

10. The data transmission apparatus according to claim 9, wherein the transmission rate of the second data is N times the transmission rate of the first data, and N is a positive integer greater than or equal to 1.

11. The data transmission apparatus according to claim 8, wherein the first frame further comprises a synchronization field to receive the first frame by the first tag and the second tag synchronously.

12. The data transmission apparatus according to claim 7, wherein the first frame comprises a result obtained after a multiplication operation is performed on the first data and the second data.

13. At least one non-transitory computer-readable storage medium storing instructions that, when executed by a computer, enable the computer to perform operations including:
generating a first frame, wherein the first frame carries first data and second data, the first data and the second data in the first frame use different modulation schemes; and
sending the first frame to the first tag and the second tag, for the first data to be obtained by the first tag and the second data to be obtained by the second tag,
wherein:
the first data uses amplitude modulation, and the second data uses phase modulation; or
the first data uses phase modulation, and the second data uses amplitude modulation; or
both the first data and the second data use amplitude modulation, and the first data and the second data have different amplitude values.

14. The at least one non-transitory computer-readable storage medium according to claim 13, wherein the first frame comprises an indication field and a data field, wherein
the indication field indicates modulation schemes respectively used by the first data and the second data; and
the data field carries the first data and the second data.

15. The at least one non-transitory computer-readable storage medium according to claim 14, wherein the indication field further indicates a transmission rate for the first data and a transmission rate used for the second data.

16. The non-transitory computer-readable storage medium according to claim 15, wherein the transmission rate of the second data is N times the transmission rate of the first data, and N is a positive integer greater than or equal to 1.

17. The at least one non-transitory computer-readable storage medium according to claim 14, wherein the first frame further comprises a synchronization field to receive the first frame by the first tag and the second tag synchronously.

* * * * *